(12) United States Patent
Garner et al.

(10) Patent No.: US 12,468,833 B2
(45) Date of Patent: *Nov. 11, 2025

(54) DIGITAL STORAGE AND DATA TRANSPORT SYSTEM USING FILE FRAGMENTS ASSIGNED TO DATA STORAGE PACKETS

(71) Applicant: Binarii Labs Limited, Leixlip (IE)

(72) Inventors: Steven Garner, London (GB); David Skelton, Thatcham (GB)

(73) Assignee: Binarii Labs Limited, Leixlip (IE)

( * ) Notice: Subject to any disclaimer, the term of this patent is extended or adjusted under 35 U.S.C. 154(b) by 118 days.

This patent is subject to a terminal disclaimer.

(21) Appl. No.: 18/529,113

(22) Filed: Dec. 5, 2023

(65) Prior Publication Data

US 2025/0181742 A1    Jun. 5, 2025

(51) Int. Cl.
*G06F 21/62* (2013.01)
*G06F 21/31* (2013.01)

(52) U.S. Cl.
CPC .......... *G06F 21/6218* (2013.01); *G06F 21/31* (2013.01)

(58) Field of Classification Search
CPC ............... G06F 16/278; G06F 16/1752; G06F 11/1458; G06F 21/6218; G06F 21/6128; H04L 9/3239; H04L 21/6218
See application file for complete search history.

(56) References Cited

U.S. PATENT DOCUMENTS

| | | | |
|---|---|---|---|
| 8,930,423 B1 * | 1/2015 | Surampudi | G06F 11/1458 380/278 |
| 11,604,888 B2 | 3/2023 | Garner et al. | |
| 2012/0124092 A1 * | 5/2012 | Teranishi | G06F 21/6218 707/783 |
| 2017/0366353 A1 * | 12/2017 | Struttmann | G06F 21/6218 |
| 2019/0036648 A1 * | 1/2019 | Yanovsky | G06F 16/1752 |
| 2019/0311148 A1 | 10/2019 | Andrade | |
| 2019/0342084 A1 | 11/2019 | Mehedy | |
| 2019/0349426 A1 * | 11/2019 | Smith | H04L 9/3239 |
| 2021/0133152 A1 * | 5/2021 | Keshtkarjahromi | G06F 16/278 |
| 2022/0070210 A1 * | 3/2022 | Keshtkarjahromi | G06F 21/6218 |

FOREIGN PATENT DOCUMENTS

| | | |
|---|---|---|
| CN | 110445840 | 11/2019 |
| KR | 102179497 B1 | 11/2020 |
| WO | WO 2019/114098 A1 | 6/2019 |

\* cited by examiner

*Primary Examiner* — Dustin Nguyen
(74) *Attorney, Agent, or Firm* — Kevin J Fournier Intellectual Property Legal Services Ltd.; Kevin J Fournier

(57) ABSTRACT

A computer-implemented method of operating a data processing system, comprising steps of: receiving, from a computing device, a request to access a file, the request comprising information identifying an actor making the request and a file to be accessed, wherein each file is fragmented into n fragments and a first subset of the n fragments containing x fragments, where x and n are integers and x is less than n, is added to a first data storage packet, a second subset of the n fragments containing x fragments is added to a second data storage packet and a third subset of the n fragments containing x fragments is added to a third data storage packet, where the subsets are selected such that any two of the first, second or third data storage packets contains all n of the fragments.

12 Claims, 12 Drawing Sheets

| Actor ID | Actor type | Actor name | Start date |
|---|---|---|---|

Fig. 2A

| Actor ID | Actor type | Actor name | Start date | End date |
|---|---|---|---|---|

Fig. 2B

| file ID | | | |
|---|---|---|---|
| Actor ID1 | Access type$_1$ | Start time$_1$ | End time$_1$ |
| Actor ID2 | Access type$_2$ | Start time$_2$ | End time$_2$ |
| ... | ... | ... | ... |
| Actor IDn | Access type$_n$ | Start time$_n$ | End time$_n$ |

Fig. 3

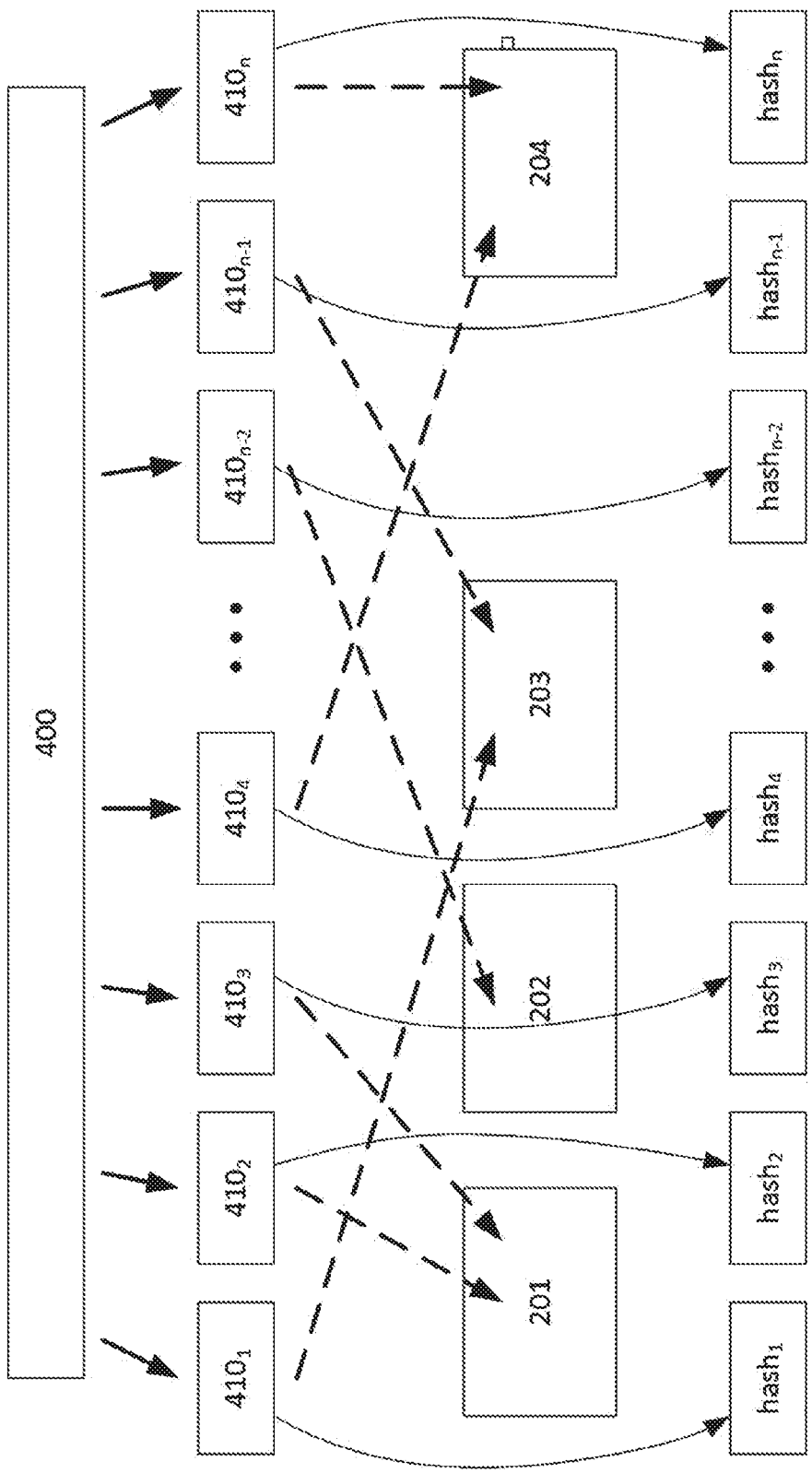

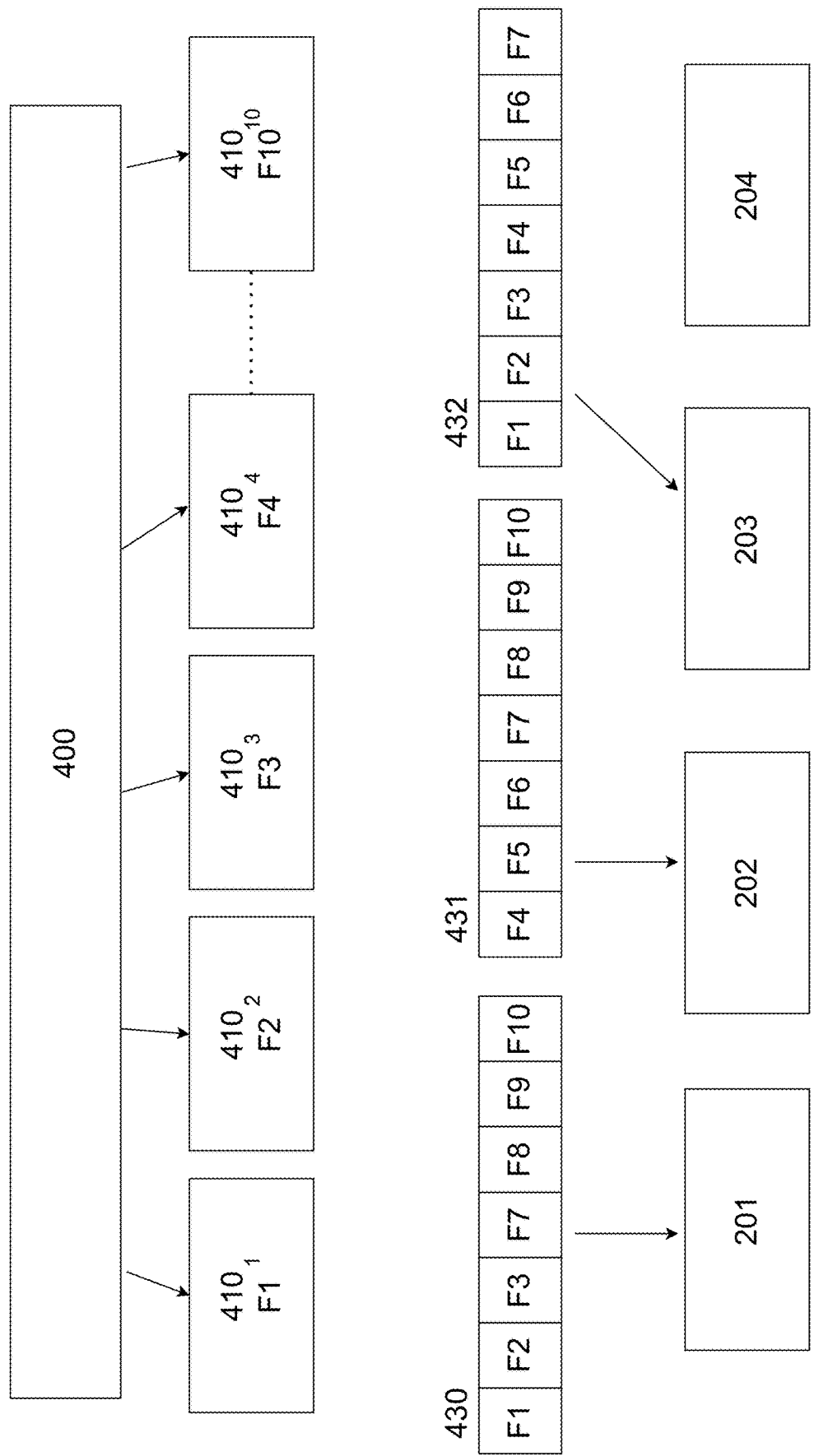

| file name, file type, file sensitivity | | | | | | |
|---|---|---|---|---|---|---|
| segm. # | segm. start addr. | segm. end addr. | storage site | storage addr. | key | hash value |
| $410_1$ or $420_1$ | addr.$_o$ | addr.$_{o+size}$ | 203 | $203_x$ | key$_1$ | hash$_1$ |
| $410_2$ or $420_2$ | addr.$_p$ | addr.$_{p+size}$ | 201 | $201_y$ | key$_2$ | hash$_2$ |
| $410_3$ or $420_3$ | addr.$_q$ | addr.$_{q+size}$ | 201 | $201_z$ | key$_3$ | hash$_3$ |
| $410_4$ or $420_4$ | addr.$_r$ | addr.$_{r+size}$ | 204 | $204_a$ | key$_4$ | hash$_4$ |
| ... | ... | ... | ... | ... | ... | ... |
| $410_{n-2}$ or $420_{n-2}$ | addr.$_s$ | addr.$_{s+size}$ | 202 | $202_b$ | key$_{n-2}$ | hash$_{n-2}$ |
| $410_{n-1}$ or $420_{n-1}$ | addr.$_t$ | addr.$_{t+size}$ | 203 | $203_c$ | key$_{n-1}$ | hash$_{n-1}$ |
| $410_n$ or $420_n$ | addr.$_u$ | addr.$_{v+size}$ | 204 | $204_d$ | key$_n$ | hash$_n$ |

Fig. 5

DIGITAL STORAGE AND DATA TRANSPORT SYSTEM USING FILE FRAGMENTS ASSIGNED TO DATA STORAGE PACKETS

FIELD

Example embodiments of the present invention are directed generally to systems and methods that implement digital file storage and retrieval.

BACKGROUND

The following description includes information that may be useful in understanding the present disclosure. It is not an admission that any of the information provided herein is prior art or relevant to the presently claimed invention, or that any publication specifically or implicitly referenced is prior art.

Traditionally digital files are stored on hard drives or other memory devices and controlled using a file manager such as a database. The database software may be owned and controlled by a third party. The operator of the database may be a third party. Trusting a third party is a concern especially when files are of a sensitive or valuable nature. Complex computer programs and systems that distribute files, such those used in cloud computing, increase the risk of file misappropriation, deletion and hacks.

With the emergence of distributed cloud computing, and applications such as Dropbox or Amazon Web Services PO allowing for fast and efficient storage onto distributed servers, files can be edited on a computing device and held in a computer device's memory and then saved to the cloud away from the device. This has perpetuated the acceptance of cloud computing and has many benefits including the aiding of disaster recovery programs and redundancy obligations.

However, such ease of storage has increased the risk of files being intercepted by unauthorized actors, lost or leaked and contributed to the diminishing trust of third party Actors. Consequently, there is an increase in concerns regarding intellectual property theft, privacy invasion, identity theft and malicious use of the files for other purposes (e.g bad Actors impersonating others). In first six months of 2019 alone global data breaches exposed 4.1 billion records. There are many security issues. Is the file a real PDF? Does it have embedded malicious code? Has the magic number been altered? If it is sent using a messaging service (Email, Messenger, Slack 0, Teams®, WhatsApp® etc), how can the sender be guaranteed there has been no intervention and the file has not been copied or altered before it reaches the recipient? When the file is transmitted is it secure using SSL? Can the certification organization be trusted? Is the cloud storage secure from bad actors and can the third party controller be trusted? Are the data centers where the cloud servers guaranteed secure? Are cloud storage replication and backups unhackable? Is the server operating system up to date with security patches? Are the security patches genuine? Are the cleaners! server installers of the data centers vetted/incorruptible? What happens to corrupted or damaged or no longer used hard drives on the servers? Encryption always has a decryption algorithm—where is this held? Databases have one superuser as do most servers. Is this super user trusted? What is the succession plan if the third party can no longer provide services? Are Actors corruptible? Where are the passwords stored? What if the passwords are lost?

Along with the security issues, the storage and retrieval of files by controlled parties is not always private. Cloud storage can be costly to the environment as data is replicated and repeated across many servers and also controlled by third party Actors who could be influenced by external government agencies. The sharing of files with approved sharer Actors is also problematic due to Actor impersonation and intentional or unintentional re transmission to other Actors including files being altered. There is consequently a desire for an improved file storage system and method.

SUMMARY

Disclosed is a computer-implemented method of operating a data processing system comprising an actor authorization node, an access right storage node, a file record node and one or more processors, the method comprising steps of:
  receiving, from a computing device, a request to access a file, the request comprising information identifying an actor making the request and a file to be accessed.
  obtaining an indication from a first computing device operated by the actor authorization node whether or not the identified actor is recorded on the actor authorization node as trustworthy, wherein the actor authorization node stores actor information in blocks in a first blockchain, such actor information identifying an actor who has access rights to stored files, such actor information including an actor ID which identifies an actor;
  obtaining an indication from a second computing device operated by the access right storage node of the access right the identified actor has to the identified file, wherein the access right storage node stores access rights information in blocks in a second blockchain, such access rights information identifying which actors recorded in the actor authorization node have access to which stored files, wherein for each stored file, the access rights information includes a list of which actors, identified by the actor's respective actor ID, has access to the stored file;
  if the identified actor has been indicated by the actor authorization node as being trustworthy and by the access right storage node as having access rights, obtaining file storage and access details from a third computing device operated by the file record node, wherein each file is fragmented and wherein individual file fragments are stored in different storage locations, and wherein the file record node stores information in blocks in a third blockchain regarding a storage location of where each fragment of each file is stored; and
  sending the file storage and access details to the computing device or using the file storage and access details to access the stored file and sending the accessed file to the computing device;
  wherein the file storage and access details comprise at least one of a file storage location, a file encryption key, a calculated characteristic of the stored file and a calculated characteristic of an encrypted version of the stored file; and
  wherein each file is fragmented into n fragments and a first subset of the n fragments containing x fragments, where x and n are integers and x is less than n, is added to a first data storage packet, a second subset of the n fragments containing x fragments is added to a second data storage packet and a third subset of the n fragments containing x fragments is added to a third data storage packet, where the subsets are selected such that any two of the first, second or third data storage packets contains all n of the fragments.

Preferably, each of the first data storage packet, the second data storage packet and the third data storage packet are stored in respective computing devices.

Preferably, each computing device is included in a separate cloud computing platform.

Preferably, each file is of size f bytes with a minimum size of m bytes, where f and n are integers, and each fragment has a random length, where the random length of each of the n fragments is generated according to the formula: length of fragment i (Li)=random value between m and (f/n).

Preferably, for a first fragment of the n fragments, the random length is between m and (f/n).

Preferably, for the second fragment of the n fragments, the random length is between m and ((f−L1)/(n−1)) where L1 is the length of the first fragment.

Preferably, the length of a last fragment of the n fragments is generated according to the formula: length of the last fragment (Ln)=Max(m, (f-sum of lengths of previous fragments).

Preferably, c subsets of the n fragments are provided, and a threshold k is selected such that k is greater than one-third of c, where c and k are integers, and k is selected so that it is possible to reconstruct the file if a third of the data storage packets are unavailable.

Preferably, a first data storage packet has x of the n fragments for a file and does not have n−x of the n fragments for the file.

Preferably, a second data storage packet has x of the n fragments for a file and does not have n−x of the n fragments for the file, where the first and second data storage packets have respectively different subsets x of the n fragments, such that the n−x fragments that are missing in the first data storage packet are contained in the x fragments in the second data storage packet.

Preferably, a file is reconstructed by obtaining k out of the c data storage packets.

Also disclosed is a system comprising means adapted for carrying out all the steps of the method just discussed.

Also provided is a computer program comprising instructions for carrying out all the steps of the method just discussed, when the computer program is executed on a computer system.

Preferably, the above system comprising an actor authorization node, an access right storage node, a file record node and one or more processors and memory storing program instructions for execution on the one or more processors. The computer program instructions, when executed by the processor causing the system to receive, from a computing device, a request to access a file, the request comprising information identifying an actor making the request and a file to be accessed, obtain an indication from the actor authorization node whether or not the identified actor is recorded on the actor authorization node as trustworthy, obtaining an indication from the access right storage node of the access right the identified actor has to the identified file, if the identified actor has been indicated by the actor authorization node as being trustworthy and by the access right storage node as having access rights, obtaining file storage and access details from the file record node and sending the file storage and access details to the computing device or using the file storage and access details to access the stored file and sending the accessed file to the computing device. The file storage and access details comprise at least one of a file storage location, a file encryption key, a calculated characteristic of the stored file and a calculated characteristic of an encrypted version of the stored file.

The calculated characteristic may be a hash.

In an embodiment the system is further configured to retrieve the stored file from a storage location identified by the file storage details, to calculate a characteristic of the retrieved file and comparing the calculated characteristic to a version of the characteristic received from the file record node.

In an embodiment the file is fragmented and individual file fragments are stored on different storage locations.

In an embodiment at least one of the actor authorization node, an access right storage node and a file record node comprises a chain of cryptographically linked blocks.

In an embodiment the system further comprises, based on file access details received from the file record node, sending requests for cryptographic information to a plurality of computing devices, receiving requested cryptographic information from the plurality of computing devices and accessing the file using joint cryptographic information based on the received cryptographic information.

In an embodiment the file comprises a plurality of file fragments stored a plurality of different storage locations.

In an embodiment the entire file and/or the file fragments are encrypted.

In an embodiment the information required to decrypt the file or the fragments is part of the file access details.

In an embodiment the information required to decrypt the file or the fragments is stored outside the system.

In an embodiment a key or keys required to decrypt the file or the fragments is fragmented and wherein key fragments are stored separate from each other.

According to another embodiment there is provided a system comprising one or more processors, memory storing program instructions for execution on the one or more processors and a communication interface to enable communicative connection of the system with an actor authorization node, an access right storage node, a file record node and one or more computing devices. The computer program instructions, when executed by the processor causing the system to receive, via the communication interface from a computing device, a request to access a file, the request comprising information identifying an actor making the request and a file to be accessed, obtain, via the communication interface an indication from the actor authorization node whether or not the identified actor is recorded on the actor authorization node as trustworthy, obtain, via the communication interface an indication from the access right storage node of the access right the identified actor has to the identified file, if the identified actor has been indicated by the actor authorization node as being trustworthy and by the access right storage node as having access rights, obtaining file storage and access details from the file record node and send the file storage and access details to the computing device or using the file storage and access details to access the stored file and sending the accessed file to the computing device. The file storage and access details comprise at least one of a file storage location, a file encryption key, a calculated characteristic of the stored file and a calculated characteristic of an encrypted version of the stored file.

According to an embodiment there is provided a computer implemented method in a system comprising an actor authorization node, an access right storage node and a file record node. The method comprises receiving, from a computing device, a request to access a file, the request comprising information identifying an actor making the request and a file to be accessed, obtaining an indication from the actor authorization node whether or not the identified actor is recorded on the actor authorization node as trustworthy, obtaining an indication from the access right storage node of the access right the identified actor has to the identified file, if the identified actor has been indicated by the actor authorization node as being trustworthy and by the access right storage node as having access rights, obtaining file storage and access details from the file record node and sending the file storage and access details to the computing device or using the file storage and access details to access the stored file and sending the accessed file to the computing device. The file storage and access details comprise at least one of a file storage location, a file encryption key, a calculated characteristic of the stored file and a calculated characteristic of an encrypted version of the stored file.

According to another embodiment there is provided a method performed in a system comprising one or more processors and a communication interface to enable communicative connection of the system with an actor authorization node, an access right storage node, a file record node and one or more computing devices. The method comprises receiving, via the communication interface from a computing device, a request to access a file, the request comprising information identifying an actor making the request and a file to be accessed, obtaining, via the communication interface an indication from the actor authorization node whether or not the identified actor is recorded on the actor authorization node as trustworthy, obtaining, via the communication interface an indication from the access right storage node of the access right the identified actor has to the identified file, if the identified actor has been indicated by the actor authorization node as being trustworthy and by the access right storage node as having access rights, obtaining file storage and access details from the file record node and sending the file storage and access details to the computing device or using the file storage and access details to access the stored file and sending the accessed file to the computing device. The file storage and access details comprise at least one of a file storage location, a file encryption key, a calculated characteristic of the stored file and a calculated characteristic of an encrypted version of the stored file.

According to another embodiment there are provided computer program instructions for execution on one or more processors, the computer program instructions, when executed by the processor causing the one or more processors to perform a method as described above. The computer program instructions may be stored on one or more non-transitory storage media.

Embodiments include a system that includes a cloud network. In some embodiments at least one air gapped computing device that is connected to the cloud network only when required is also provided. The cloud network may include a plurality of computing devices. The plurality of computing devices implement a plurality of nodes. The plurality of nodes implement Actor records, Assignment records and Agreement records. At least a plurality of nodes are operated by a validation authority, or Oracle. In an embodiment the Oracle is configured to control and/or validate the Actor records. In one embodiment the Oracle is the controller of the business and logic rules and is the superuser Actor that is stored on the actor storage node. In one embodiment the Oracle operates under the control of a government or an institution. In an embodiment the Oracle may be the first ever actor on then node/the genesis actor so to speak. In other embodiments may be located separate from/outside of the actor node in a computing device in communicative connection with the Actor node.

The computing devices in the network may be different from one another.

If passcodes are stored locally, for example on actor computing devices, the local storage may be air gapped and offline from the plurality of nodes and may include copies of the plurality of nodes or a portion of the raw byte data stored in the plurality of nodes In some embodiments of the system, each of the plurality of computing devices stores a local or offline copy of a distributed hash table.

The system comprises at least three nodes. Using a process of file fragmentation and distribution of private keys reduces data breaches and leakages. Trusted government agencies will be permissioned to maintain, as a validation authority, an Actors blockchain. The actors blockchain records Actors such as Naturals and Non Naturals. Naturals, human beings have a birth date and death date. Blockchain agreement records the data needed to identify and re-assemble stored files. To ensure the Blockchain agreement records cannot be altered or deleted, but can also be proved, a thresholding system of controlling, preferably offline, the private keys and decryption passcodes is provided. An Assignments blockchain controls the access rights to the stored files.

BRIEF DESCRIPTION OF THE DRAWINGS

Various embodiments in accordance with the present disclosure will be described with reference to the drawings, in which:

FIG. 2A is an example of data stored in the actor storage node 101;

FIG. 2B is another example of data stored in the actor storage node 101;

FIG. 3 illustrates information stored in a block of the assignment storage node;

FIG. 4A shows an embodiment in which a file to be stored is fragmented;

FIG. 4D shows an embodiment in which a file to be stored is fragmented and the fragments are placed into packets for storage;

FIG. 5 shows data stored in a block of the agreement storage node;

DETAILED DESCRIPTION OF EMBODIMENTS

In the following description, various embodiments will be described. For the purposes of explanation, specific configurations and details are set forth in order to provide a thorough understanding of the embodiments. However, it will also be apparent to those of ordinary skill in the art that the embodiments may be practiced without the specific details. Furthermore, well-known features may be omitted or simplified in order not to obscure the embodiment being described.

Figure 1:
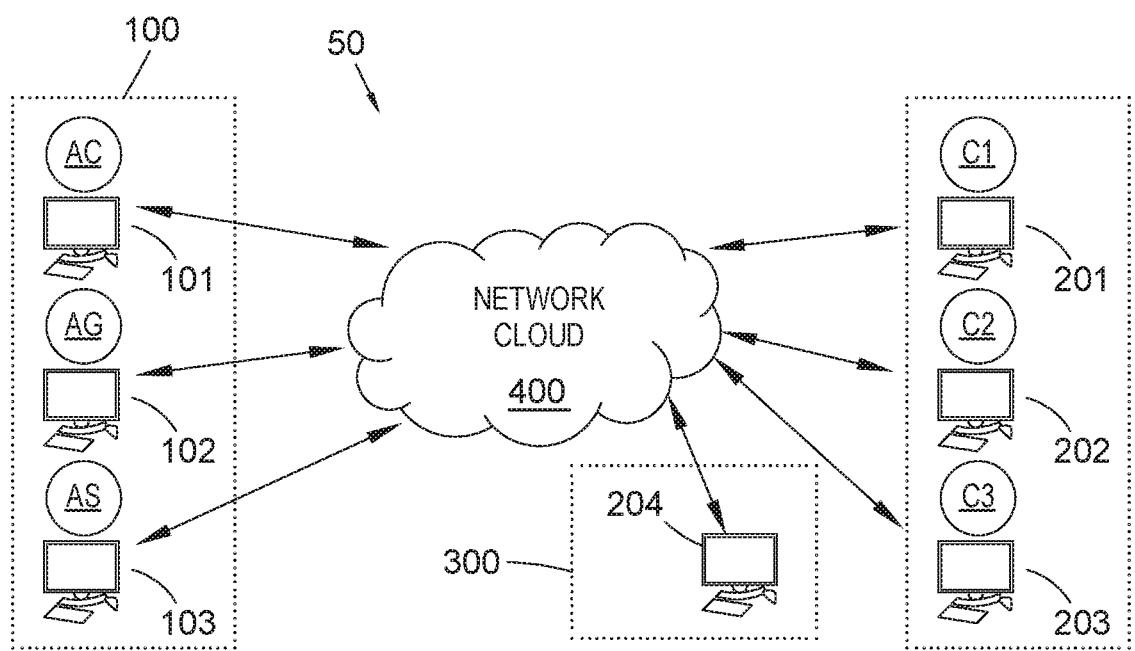
FIG. 1 shows an overview of a file storage system according to an embodiment.

FIG. 1 is a diagram of a system 50 configured to implement a file storage and passcode archive. The system 50 includes a plurality of computing devices 100 operated by a plurality of nodes including an Actor storage node 101, an Agreement storage node 102 and an Assignment storage node 103 and a plurality of computing devices 201-204 operated by a plurality of actors. The actors may be human actors or legal entities. An oracle (not illustrates) oversees and governs the operation of the system 50. The operation of the oracle is described in more detail below.

The computing devices 101-103 and 201-203 are connected to one another by a network 400 (e.g the Internet). The system 50 may comprise a further computing device 204 that is only intermittently connected or entirely unconnected from the network 400.

Actors are natural or legal entities that may try to act upon data stored or to be stored. Data may, for example be stored in storage devices in the network cloud 400 or in any of the computing device 201 to 204 accessible through the network cloud 400. They may consequently be natural or legal entities that can store a file in the network cloud 400 or in computing devices 201 to 204, that have authority to modify a previously stored file or to simply read/access such a previously stored file.

Each actor has a unique identifier. Actors may further be associated with an actor type that identifies the actor as natural or non-natural. The system 50 is configured to only permit actors to store/amend/access files if the actor is verified as trustworthy on actor storage node 101.

In one embodiment the actor storage node 101 stores actor information in a blockchain. The actor storage node 101 can be administered by an entity other than the entity responsible for operating the system 50. For example, the actor storage node 101 may be operated by a government body or another official body maintaining a register of actors, such as Companies House in the United Kingdom for companies or the National Health Service (NHS) for individuals, or by a privately operated trusted body. In some embodiments the actor storage node 101 is a locally controlled or operated CRM system. In embodiments the actor storage node 101 is under the exclusive control of the operator of system 50. Although only a single actor storage node 101 is shown in FIG. 1 in another embodiment multiple actor storage nodes 101 may be provided/used for validating actors, for example for validating different classes of actors. The storage nodes 101,102 and 103 validate each other by verifying the existence and validity of various identifiers in conjunction with consensus rules as agreed by the storage nodes. For example, an actor assigning an Agreement to another actor can only be done if the actors exist on the Actor node.

FIG. 2A shows data relating to actors stored in actor storage node 101. The data comprises an actor ID that is unique to the actor storage node 101 and identifies the actor type (i.e. natural or non-natural) by also including actor type information. Optionally the actor name (be that the name of a natural person or the (registered) name of a legal entity is also included in the actor data. The actor data may have time stamps associated with it. For example, data relating to individual actors may comprise a start time stamp, indicating when the actor has been included in the actor storage node 101 and/or when the identity or trustworthiness of the actor concerned has been verified. Alternatively, the start time stamp may simply indicate the birth date of a natural actor. In another embodiment data relating to natural or non-natural actors comprise two start time stamps, with one time stamp indicating the date of birth if the actor is a natural actor of a date of foundation or incorporation of a non-natural actor and the other date indicating a date at which the actor has been classified as a trustworthy actor and/or noted as such in the data stored in the actor storage node 101. If the actor storage node 101 operates a blockchain the actor data shown in FIG. 2A are added as a new block to the blockchain in a known way. Prior to the addition of the data to the block the data are encrypted using the actor's public key so that sensitive data are not accessible to parties other than those that have been explicit permission to do so by the actor, for example as recorded in the Assignment storage node 103. In this, the actor ID remains unencrypted to allow searching of the various blocks in the chain. In an alternative embodiment, the data stored in the actor storage node 101 are encrypted using a key or keys only known to the actor storage node 101 or to the entity governing the operation of the actor storage node 101. In this manner the actor storage node 101 can access the stored data and determine a trustworthiness or other status of an actor and/or update an actor status when requested to do so and report results of the action taken to the requester without having to divulge stored information to other entities.

As shown in FIG. 2B, the data relating to actors stored in the actor storage node 101 may further comprise a time stamp indicating the end of a period of validity of the assessment of trustworthiness of the actor concerned. Alternatively or additionally the end date time stamp or an additional end date time stamp may indicate the date at which a non-natural actor has stopped existing or a natural actor has died. The data shown in FIG. 2B is added to the blockchain of the actor storage node 101 as a new block in a known manner. Although the data shown in FIG. 2B is an update of the data shown in FIG. 2A, the data shown in FIG. 2A remains part of the older block of the actor storage blockchain. The most up-to-date version of the data is located within the blockchain by searching for the actor ID of interest starting from the newest block and investigating the blocks in the chain in reverse time sequential order until the actor ID is found. In so doing the most up-do-date information actor information is the first information relating to the actor in question that is found.

The actor storage node 101 is configured to, when interrogated if a given actor (identified, for example, by the unique actor ID) is trustworthy, locate the data entry relating to the actor and check if the identified actor is present on the node's datastore. The actor storage node 101 is further configured to determine, if it had previously determined that the actor is listed on the database, whether or not the start time stamp indicates that the actor has successfully been verified as being trustworthy and whether or not the end time state indicates that the verification is still valid/has expired. In one embodiment the actor storage node 101 100 does not only store information relating to actors that have been verified as being trustworthy but also information relating to actors that have failed to obtain such verification or for whom a certificate of verification has expired. In an embodiment actor data stored in the actor storage node 101 may comprise data fields in addition to the data field indicated in FIGS. 2A and 2B, with the additional data fields indicating a date at which an actor has failed a trustworthiness assessment or has failed to obtain an assessment of trustworthiness.

In one embodiment the actor storage node 101 stores actor information in the form of a blockchain, with initial entries of actor data being located in an encrypted block. Any changes to the actor data in the blockchain, be they changes to the start and or end time stamps mentioned above, changes in other properties of the actor, say change in legal entity status, key personnel or any other change of data relating to the actor that is designated for storage in the actor storage node 101 Whilst the actor storage node 101 relates to individual actors who can each be involved in the storage, access or modification of numerous files, each agreement stored in the agreement storage node 102 relates to only one file stored in the assignment storage node 103. Consequently, there is a one-to-one relationship between agreement data stored in the agreement storage node 102 and the related assignment data stored in assignment storage node 103.

FIG. 3 shows assignment data stored in assignment storage node 103. These data provide details of the access rights associated with a particular file. The file is identified by a file ID that uniquely identifies the file within the assignment storage node 103. Each data set relating to an identified file further lists all n actor IDs, actor ID-1 to actor ID-n in FIG. 3, of actors that have or had access rights to the file as well as the type of access right (access type-1 to access type-n in FIG. 3) associated with the individual actors. Various actors may have the same or different access rights. Access rights include read access, read and write access, permission to erase the file and/or permission to change access rights to the file for individual, named ones of the actors, groups of named actors or all actors that have been granted access to the file. A start time (start timer to start time-n) indicating the date and/or time when the access type was granted to the actor in question is provided alongside the access type. This time may be the same for all actors, for example if the access types are associated with the individual actors at the time of file creation. Alternatively, the start time may be different for different actors if actors permitted to access a file are added after the file has been created. An end time (end time-1 to end time-n) may additionally be provided alongside individual access rights. End times are provided if the access right of an actor is for a limited time period only (in which case the end time may be in the future, if the time limit has not yet expired or in the past if it has) or for actors whose access rights have been rescinded (in which case the end time will be in the past).

Although FIG. 3 shows a data set in which actors are only mentioned once, in an embodiment actors can be mentioned multiple times in the data set. An actor may, for example be entrusted with a number of access rights, such as a read access right, a write access right, the right to modify or the right to erase the file. The start and end times associated with the individual rights may not be the same and each access right is consequently listed in an individual row of the data set. A group of actors may, for example, be given the right to access and modify a file within a first time window but have their access rights limited to read only access thereafter for a second time period and/or completely removed after the end of the first or second time period. In addition to the data shown in FIG. 3, the data stored in the assignment storage node 103 may include one or more or all of the name/identify of the owner, the creator and a current custodian.

The data stored in the assignment storage node 103, such as the assignment data set shown in FIG. 3, is stored in a block of a blockchain maintained by the assignment storage node 103. Each assignment data set is added to the block chain as a new block in a known manner. Updates to the assignment data set are stored in a further new block that is added to the blockchain.

The agreement data stored in the agreement storage node 102 stores file information, such as file name, file type and file sensitivity. Files can have different sensitivity levels. For example, a file may have a low sensitivity level so that access to it is not deemed detrimental. Other files may have a higher sensitivity level and may be classified restricted so that they are supposed to be only accessible by one or more designated/predetermined parties or by those the predetermined parties subsequently grant access rights. To prevent unauthorized access to files the file 400 is fragmented into fragments 410-1 to 410-n, as shown in FIG. 4A and the fragments 410-1 to 410-n are stored in different locations on the network cloud 400 and/or on one or more of computing devices 201 to 204, as illustrated in FIG. 4A.

Figure 4B:
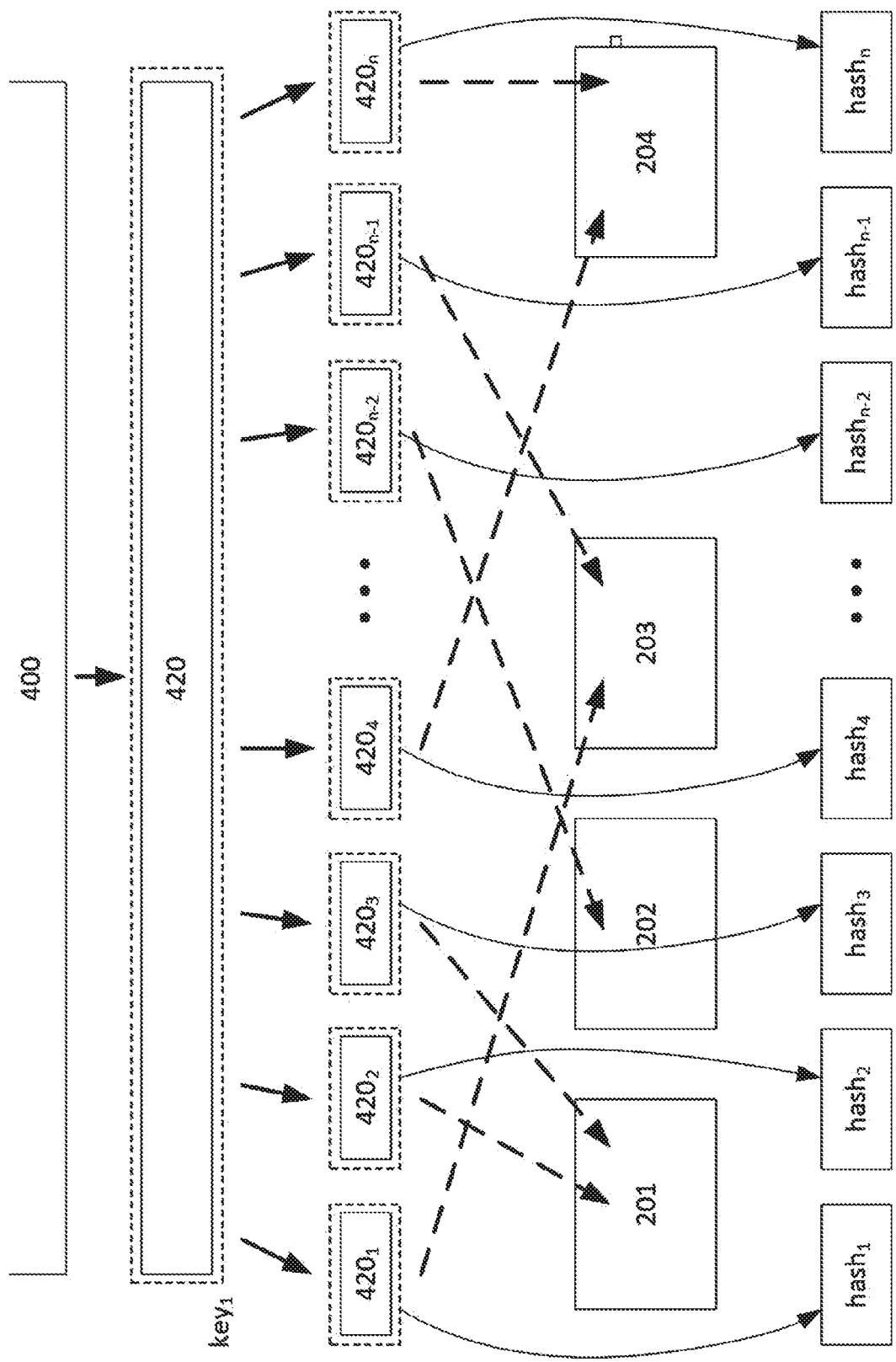
FIG. 4B shows an embodiment in which a file to be stored is encrypted and fragmented.

In one embodiment, shown in FIG. 4B a file 400, prior to fragmentation the file is encrypted to generate encrypted file 420. The encrypted file 420 is then fragmented into fragments 420-1 to 420-n. Encrypted fragments 420-1 to 420-n are stored in different locations on the network cloud 400 and/or on one or more of computing devices 201 to 204. In this case only a single key, key-1, is necessary for decrypting the encrypted file 420 after it has been re-assembled from the fragments 420-1 to 420-n.

Figure 4C:
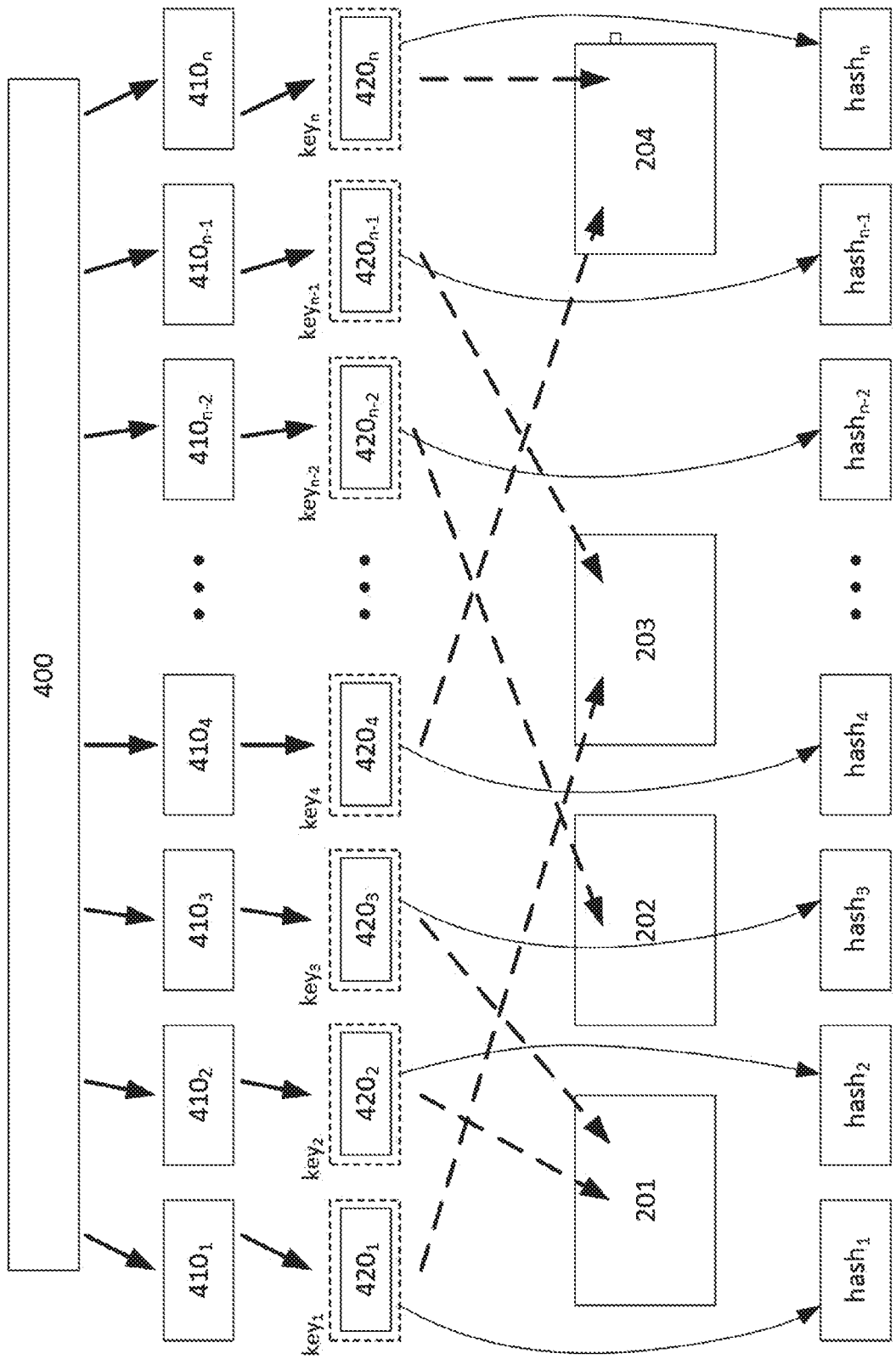
FIG. 4C shows an embodiment in which a file to be stored is fragmented and encrypted.

In another embodiment, shown in FIG. 4C, the file 400 is first fragmented into fragments 410-1 to 410-n and the fragments 410-1 to 410-n are then individually encrypted to form encrypted fragments 420-1 to 420-n. These are in turn stored in different locations on the network cloud 400 and/or on one or more of computing devices 201 to 204. In this instance each encrypted fragment 420-1 to 420-n is decrypted before the fragments are re-assembled into the original file 400. Each encrypted fragment 420-1 to 420-n has its own key for decryption, although, in one embodiment the individual keys may be identical.

As the fragments 410-1 to 410-n or encrypted fragments 420-1 to 420-n are stored in storage devices that may be unsecured or at least accessible by third parties the fragments 410-1 to 410-n, or encrypted fragments 420-1 to 420-n, may be modified prior to their retrieval. To ensure that the fragments 410-1 to 410-n, or encrypted fragments 420-1 to 420-n retrieved from their respective storage locations can reliably be known as not having been altered or tampered with a hash value, hash-1, to hash-n, of the individual fragments 410-1 to 410-n, or encrypted fragments 420-1 to 420-n, is created at the time they are stored.

The agreement storage node 102 stores details of the locations in which the individual fragments of a file are stored and the order in which they are to be reassembled to form the original file. The details of the storage location of a fragment may include the IP address of the storage device storing the fragment as well as the location of the fragment within a file system of the storage device. In another embodiment each fragment may be stored in multiple sites to create redundancy for accessing the stored fragment, should one of the storage sites be unavailable for access. In this case details of the multiple storage locations are recorded by system 50.

Data stored in a block of the agreement storage node 102 blockchain is shown in FIG. 5. In the embodiment data relating to each fragment 410-1 to 410-n, or to each encrypted fragment 420-1 to 420-n, respectively are stored. These data include the start and, optionally, the end addresses of the fragment/encrypted fragment within the file 400, the storage device/site on which the fragment or fragment 410-1, to 410-n, or encrypted fragment 420-1 to 420-n, is stored, the address on the device/site at which the fragment 410-1 to 410-n or to encrypted fragment 420-1 to 420-*n*, is stored and, optionally the hash value of the fragment 410-1 to 410-*n*, or to encrypted fragment 420-1 to 420-*n*, as computed at the time of storage. In one embodiment keys required for decrypting the fragments are also stored on the agreement storage node 102, as shown in FIG. 5. It will be appreciated that in this situation any actor permitted to access the stored file may gain access to the keys. If an actor's access rights to the file expire or are rescinded the actor may still have copies of the keys. In this situation the stored file may have to be re-assembled, re-fragmented and re-encrypted using new keys or at least the fragments have to be re-encrypted using new keys before storing. The new keys can be stored in an updated block of the agreement storage node 102. The actor whose access rights to the file have been rescinded is no longer given access to the relevant block of the agreement storage node 102, so that the actor is prevented from continuing accessing the store file.

In an alternative embodiment the keys key to key n of the fragments 410-1 to 410-*n* and 420-1 to 420-*n* are not stored on the agreement storage node 102 and are instead transmitted by the oracle to one or more actors for storage. The keys may, for example, be stored by a single actor, for example the actor that instigates the file exchange. In this case the actor may undertake any of the fragmentation, encryption and/or hashing of the fragments discussed herein with reference to FIG. 4A, FIG. 4B or FIG. 40 and use the Oracle to cause the storage of files and to perform checks as described herein. Alternatively, the Oracle undertakes all operations relating to the file but then, instead of reporting the encryption keys to the agreement storage node 102, returns them to an actor or the actors designated to store the keys. This actor or these actors, can be considered custodian actors. Custodian actors may be actors that have been designated by the actor initiating storage of a document or may be predetermined actor types entrusted with the task of taking custody of a stored file. Such predetermined actors may be professionals in the relevant profession to which the stored file relates. These may be clinicians if the stored file is part of a patient medical record, solicitors or notaries if the stored file is a legal document. The trustworthiness of custodian actors is verified in the same manner as described herein with reference to other actors. In one embodiment the actor storage node 101 queried regarding custodian actors may be a storage node 101 storing actor data relating to a particular profession in question, such as a storage node maintained by a regulatory body for the particular profession.

It will be appreciated that, whilst in the embodiment shown in FIG. 5 a separate key is provided for each fragment, in other embodiments several or all fragments may be encrypted with the same key. In one embodiment, for example, the fragments are grouped in groups of equal size and a single key is used to encrypt all fragments in a particular group.

In embodiments in which the keys are not stored in the agreement storage node 102 an actor may be given custody of the key or keys. In yet another embodiment custody in the keys may be shared amongst a number of actors so that the stored file can only be accessed or modified if a number of actors agree to it. In one embodiment this is achieved in that a first sub-set of keys that does not include all keys for all fragments, is entrusted to a first actor and a second sub-set of the keys is entrusted to a second actor. In this manner the file concerned can only be accessed if both actors make their keys available to the Oracle for re-assembly of the fragments into an accessible file. Whilst in this example two custodian actors are discussed, any number of custodian actors that is greater than one may be involved.

In another embodiment allocation of keys is not unique to custodian actors, so that each key is stored by at least two custodian actors to prevent inadvertent loss of access to the stored file through loss of the keys of one custodian actors, be that through technical malfunction or unavailability of the custodian actor. A set of n keys may, for example, be distributed to a number a of actors so that each actor received ½*n/a keys. In an example comprising 12 keys the first actor may, for example, receive keys 1 to 6, the second actor keys 4 to 9, the third actor keys 7 to 12 and the fourth actor keys 10 to 12 and 1 to 3.

In yet another embodiment the keys themselves may be fragmented into a number of fragments that may correspond to the number of custodian actors, wherein each custodian actor receives only fragment of the key, so that file fragments can only be encrypted if all custodian actors make their key fragments available to the Oracle for decryption of the fragment(s). In another embodiment each key fragment may be distributed to more than one custodian actor in the same manner as discussed above with reference to the individual keys. A private key may, for example, be split into 3 parts (e.g PK=123456789. Custodian 1 receives 123×789, Custodian 2 receives x456789 and Custodian 3 receives 123456x. In this case only 2 Custodians are needed to have the full private key. This thresholding can be expanded depending on the sensitivity of the file. In this case (with 3 Custodians) the file hash is split into three parts.

The data stored in the agreement storage node 102 further includes the hash values of the individual fragments described above. It will be appreciate that the individual stored fragments may be accessed by unauthorised actors in their respective storage locations. Whilst the file may be fragmented in such a manner or to such an extent that the information content of an individual fragment renders access to an individual unencrypted fragment or to a fragment that has been decrypted by an unauthorised party, meaningless, an unauthorised party may still attempt to inject different content into the fragment before storing it again in the fragments original storage location and using the originally used encryption technique. Such content may be content that causes a file assembled using the modified fragment to facilitate a cybersecurity breach by the unauthorised party to a computing device accessing the file. Any such modification by an unauthorised party to a fragment will, however, alter a hash value of the fragment calculated during or following its retrieval from storage. The Oracle or any computing device using retrieved fragments to re-assemble the stored file is configured to calculate the hash value of the retrieved fragment following its retrieval and to compare the computed hash value with the corresponding hash value stored in the assignment storage node 102.

In a further embodiment the keys or fragments of the keys, in as far as they are stored by custodian actors, are stored in air gapped devices for further increased security of file storage.

The data stored in the agreement storage node 102, such as the agreement data set shown in FIG. 5, is stored in a block of a blockchain maintained by the agreement storage node 102. Each agreement data set is added to the block chain as a new block in a known manner. Updates to the assignment data set are stored in a further new block that is added to the blockchain.

FIG. 4D shows a further improvement of the disclosed technology, which deals with the issue of an authorised user (such as a hacker) gaining access to a computing device 201

(for example) which is located on a specific cloud computing platform. In this situation, the unauthorised user should not be allowed to access a plurality of the fragments in such a way that the unauthorised user can gain access to the data 400.

FIG. 4D also deals with the issue of one of the cloud computing platforms going down for some reason and being inaccessible. For example, computing device 201 may be on a first cloud computing platform and each of computing devices 202-204 may also be on its own cloud computing platform. If that happens, it would be very useful to still be able to allow authorised users to have access to the data.

In FIG. 4D, the file 400 is fragmented into a plurality of fragments, as in FIG. 4A. In this example, there are 10 fragments, 410-1 to 410-10, also labelled as F1 to F10, respectively, in FIG. 4D. In other examples, this could be any number of fragments. These 10 fragments are then divided into a plurality of groups or packets, and in this example, the 10 fragments are divided into 3 packets (430, 431 and 432), but any number could be chosen. Then, specific fragments of the 10 fragments, are assigned to each packet, in such a way that only seven out of the 10 fragments are assigned to each packet. For example, fragments F1, F2, F3, F7, F8, F9 and F10 are assigned to packet 430; fragments F4, F5, F6, F7, F8, F9 and F10 are assigned to packet 431; and fragments F1, F2, F3, F4, F5, F6 and F7 are assigned to packet 432. This assignment of fragments to packets is shown in FIG. 4D.

As is clear from the assignment above, each packet 430, 431 and 432 contains less than all of the 10 packets. In this example, 7 out of the 10 packets are contained in each packet. Also, any two of the packets contains all 10 of the fragments. That is, between them, packets 430 and 431 contain the 10 fragments (packet 430 is missing fragments F4, F5 and F6, but packet 431 has these three missing fragments). Further, between them, packets 431 and 432 contain the 10 fragments (packet 431 is missing fragments F1, F2 and F3, but packet 432 has these three missing fragments). Still further, between them, packets 430 and 432 contain the 10 fragments (packet 430 is missing fragments F4, F5 and F6, but packet 432 has these missing fragments).

Each of the three packets is then stored on a separate computing device 201, 202, 203, where each such computing device can be located in its own separate cloud platform environment or platform. For example, packet 430 is shown in FIG. 4D to be stored onto computing device 201, packet 431 is shown to be stored onto computing device 202 and packet 432 is shown to be stored onto computing device 203.

Accordingly, if an unauthorised user were to gain access to the cloud computing platform that includes computing device 201, for example, the unauthorised user would only have access to 7 of the 10 fragments (fragments F1, F2, F3, F7, F8, F9 and F10). The unauthorised user would not have access to fragments F4, F5 and F6. This therefore prevents the unauthorised user from having the entirety of the data 400. Even if the unauthorised user could somehow re-assemble the fragments into the correct order of the data 400 prior to fragmentation, the unauthorised user would not have the entirety of the data 400 due to the missing three fragments.

Likewise, if one of the cloud computing platforms, such as the cloud computing platform which includes computing device 201, goes down for some reason, such as due to a power failure, or a weather event such as a storm or flood, the data 400 can still be obtained in its entirety, since the entirety of the 10 fragments will still be accessible on the computing devices 202 and 203 included in the two other respective cloud computing platforms (the cloud computing platform including computing device 202 and the cloud computing platform including computing device 203).

A more detailed description will now be given of this improvement, with reference to the flow chart of FIG. 4E.

Step 1: Break the File into Fragments (Step 433 of FIG. 4E)

With a file 400 of size 'f' bytes (with a minimum size of 'm'), the file 400 is broken into 'n' fragments with each fragment having a random length. In the example above in FIG. 4D, n=10.

The file 400 can be encrypted with a public key. The hash of the full file 400 can be taken. Alternatively, the hash of the individual fragments can be taken. As a further alternative, the hash of the packet of fragments, described above, could be taken.

Any of the hashes just described can then be added to a blockchain, associated with the agreement node (or file record node) with indicators as to where the location of the fragments are and in what order the fragments should be gathered in order to recreate the file 400. Where encryption is used, the owner of the file 400 owns a private key that can be used to decrypt the f bytes of the file 400. The private key may be fragmented in the same way the file 400 is fragmented and encrypted with another public key. The controller of the file, managed by the owner of the file, determines the parameters of the location of the fragments (where they are stored, the location could be an Internet Protocol address, a blockchain public key, an IPFS (Interplanetary File System) node or a longitude/latitude) and agreements to use (the agreement node is required to retrieve the fragments ut the agreement node may be a dummy used for the purpose of making the retrieval more difficult for bad actors).

Some formulas which govern the terms described above are as follows:

1. To generate random lengths for each of the 'n' fragments (n–1, n–2, . . . , n–n), the following formula is used:

Length of fragment $i$ ($Li$)=Random value between $m$ and ($f/n$)

For the first fragment (n–1), the random value will be between m and (f/n).
For the second fragment (n–2), the random value will be between m and ((f–L1)/(n–1)), where L1 is the length of the first fragment.
Continue this pattern for the remaining fragments.

2. To ensure that 'f' is at least m bytes, the length of the last fragment (nn) can be calculated as follows:

Length of the Last Fragment ($Ln$)=Max($m$,($f$–Sum of Lengths of Previous Fragments))

Step 2: Add Fragments to Packets (Step 434 in FIG. 4E)

The next step, in a preferred embodiment, is to create 'c' groups or packets ("c" was equal to 3 in the example above of FIG. 4D) to be stored on a plurality of data storage devices, where, for example, each data storage device is included in one cloud computing platform. In the example above of FIG. 4D, each of the "c" packets was stored on one data storage device. Each such data storage device will receive a subset 'x' of the 'n' fragments. In the example above of FIG. 4D, the subset 'x' was 7 fragments of the total of 10 fragments.

A threshold 'k' should be set such that "k" is greater than one-third of the 'c' packets (k>c/3) and 'k' is selected so that it is possible to reconstruct the original file 'f' if a third of the packets are unavailable. In the example above of FIG. 4D, 'k' was equal to 2 and 'c' was equal to 3 (corresponding to the 3 packets 430, 431 and 432) and one third of c was equal to 1 and so k (equals 2) was greater than one third of c (one third of c is equal to 1, where c equals 3).

The number of fragments added to each packet is such that the subset 'x' (7 in the example) is missing n−x fragments. That is, each of the c packets has x fragments but does not have n−x fragments.

Specifically, a first of the c packets has x fragments, and is missing n−x fragments. In the example of FIG. 4D, the first packet is 430 and the missing n−x fragments are F4, F5 and F6.

A second of the c packets has x fragments, where the x fragments include the specific n−x fragments that were missing from the first of the c packets. In the example of FIG. 4D, the second packet 431 includes the fragments F4, F5 and F6 that were missing from the first packet 430.

A third of the c packets also has x fragments, where the x fragments also includes the specific n−x fragments that were missing from the first of the c packets. In the example of FIG. 4D, the third packet 432 include the fragments F4, F5 and F6 that were missing from the first packet 430.

Likewise, a second of the c packets has x fragments, and is missing n−x fragments. In the example of FIG. 4D, the second packet is 431 and the missing n−x fragments are F1, F2 and F3.

A first of the c packets has x fragments, where the x fragments include the specific n−x fragments that were missing from the second of the c packets. In the example of FIG. 4D, the second packet 431 includes the fragments F1, F2 and F3 that were missing from the second packet 431.

A third of the c packets also has x fragments, where the x fragments also includes the specific n−x fragments that were missing from the second of the c packets. In the example of FIG. 4D, the third packet 432 include the fragments F1, F2 and F3 that were missing from the second packet 431.

Likewise, a third of the c packets has x fragments, and is missing n−x fragments. In the example of FIG. 4D, the third packet is 432 and the missing n−x fragments are F8, F9 and F10.

A first of the c packets has x fragments, where the x fragments include the specific n−x fragments that were missing from the second of the c packets. In the example of FIG. 4D, the first packet 430 includes the fragments F8, F9 and F10 that were missing from the third packet 432.

A second of the c packets also has x fragments, where the x fragments also includes the specific n−x fragments that were missing from the third of the c packets. In the example of FIG. 4D, the second packet 431 include the fragments F8, F9 and F10 that were missing from the third packet 432.

Step 3: Reconstruction of the Original File (Step 435 in FIG. 4E)

To reconstruct the original file 'f', 'k' out of the 'c' packets are gathered. In the example of FIG. 4D, 2 of the 3 packets are gathered. These 'k' packets can combine their fragments to reconstruct 'f'. This is because, as was explained above, any two of the three packets has all of the n fragments.

A controller is controlled by the owner of the file f and determines the variables k, n, and c and the processing of the file. The controller may randomly allocate dummy fragments to deter bad actors (such as hackers) who may seek to determine details about the file.

Figure 4E:
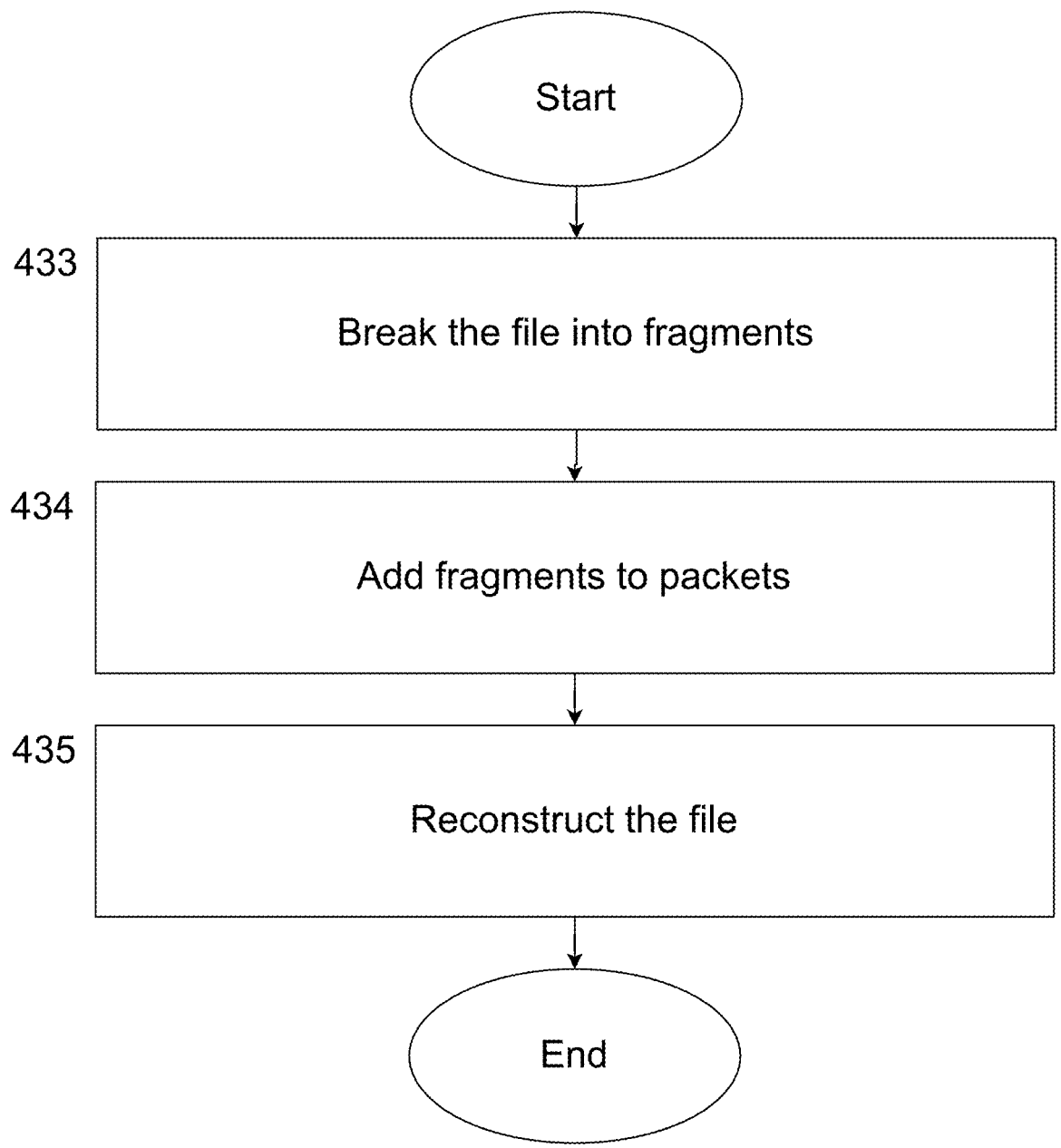
FIG. 4E is a flow chart illustrating the steps involved with the embodiment of FIG. 4D.

The same hashing and encryption techniques which were described and illustrated above in conjunction with FIGS. 4A-4C can also be applied to the embodiment of FIGS. 4D-4E above.

Figure 6:
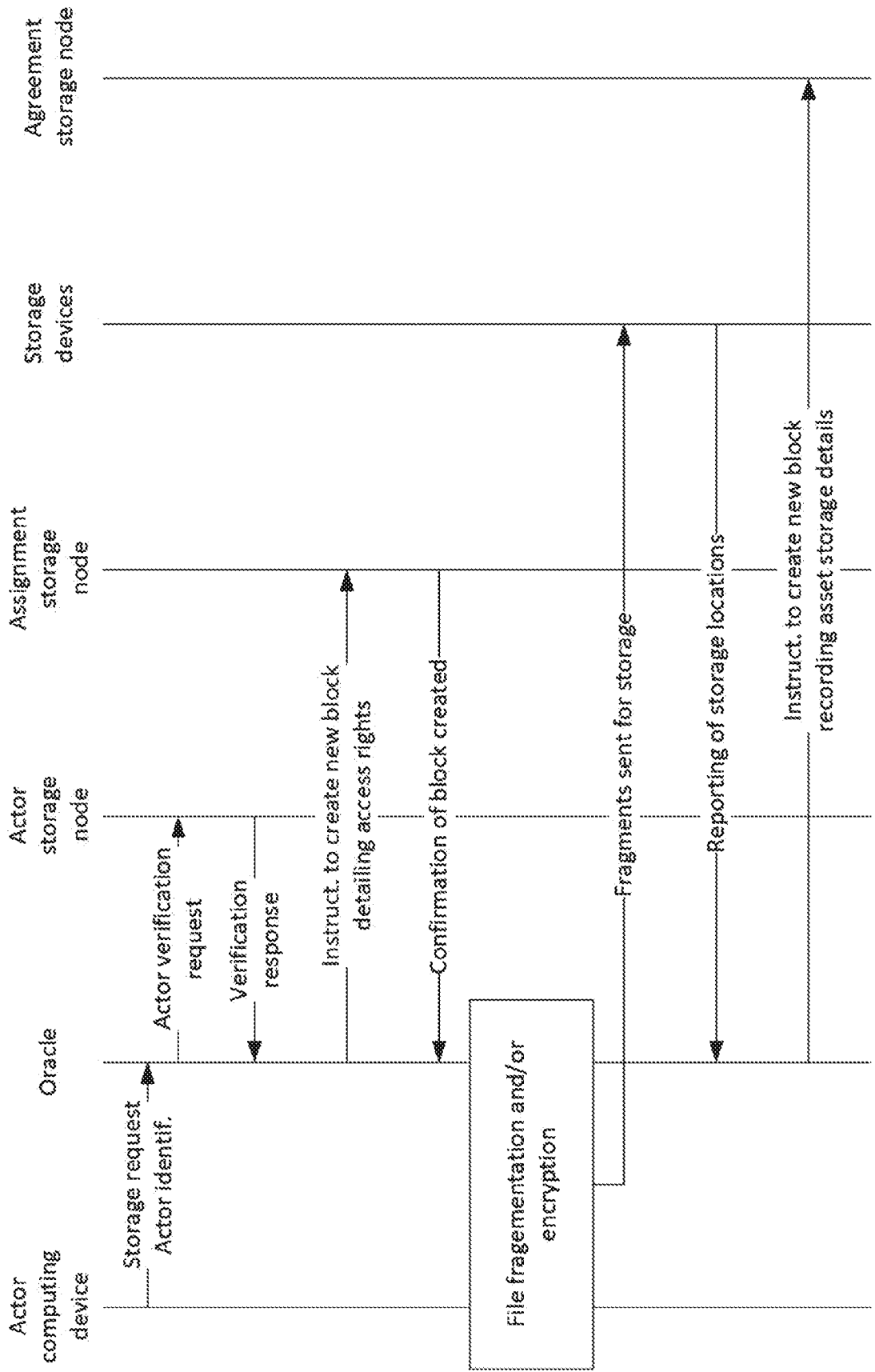
FIG. 6 illustrates a message exchange when storing a file in an embodiment.

FIG. 6 illustrates the exchange of messages and data in a process of storing a new file on the storage devices connected to the system shown in FIG. 1. The storage process is initiated by an actor wishing to store data on the storage devices by the sending of a storage request from the computing device operated by the act to the Oracle. The storage request comprises information suitable for identifying the actor or actors wishing to store the file. This information may comprise the actor's legal name(s) or the actor ID(s) discussed above with reference to FIG. 2A. Upon receipt of the storage request from the actor computing device the Oracle sends a request to verify the identity and/or status of the actor(s) having sent the file storage request to the actor storage node 101. The request sent by the Oracle also comprises information suitable for identifying the actor(s) on the actor storage node 101. The actor storage node 101 uses the received information to locate an up-to-date data entry relating to each actor. The actor storage node 101 may achieve this by searching its records in reverse order from the order used to store the records until the data entry relating to an actor in question has been located. The data entry relating to the actor may be identified using the actor ID if received with the actor verification request from the Oracle or may, alternatively, be identified by the actor storage node 101 by decrypting individual stored data entries (if they are encrypted) to allow comparison of an actor name received from the Oracle with an actor name stored as part of the data entries. Once the actor storage node 101 has successfully located the up-to-date data entry relating to the actor it transmits a status report to the Oracle. This status report includes, as a minimum requirement, an indication of whether or not the actor is permitted to access/store data on the storage devices.

The Oracle may reside at any location in the system, including in the actor storage node and may, in one embodiment, reside in a dedicated computing device communicatively connected to the system.

If the indication received from the actor storage node 101 indicates that the actor is not entitled to access/store data on the storage devices than the Oracle informs the actor computing device accordingly (not shown).

Conversely, if the indication received from the actor storage node 101 indicates that the actor is entitled to store data on the storage devices the Oracle proceeds to send a request (not shown) to the actor storage node 101 to verify the identity and/or status of all of the other actors that have been indicated in the data storage request received from the actor computing device as being given file access rights. The actor storage node 101 verifies the authenticity/trustworthiness of all of the queried actors in the above described manner and reports back to the Oracle in the above described manner (not shown). It will be appreciated that query can be performed by sending a single request comprising all of the actor names or actor IDs in question from the oracle to the actor storage node 101. In this case, a single or more than one reports may be received, sent from the actor storage node 101 to the Oracle, indicating the trustworthiness or authentication of the individual actors. In another embodiment the trustworthiness of all of the actors that are to be given file access rights is established in the above described manner in a single step in which the trustworthiness of the actor making the file storage request is checked alongside that of all other actors named as being eligible to access the file.

If the actor storage node 101 has indicated to the oracle that all actors are trustworthy, the oracle sends a request to the assignment storage node 103 to create a new block comprising the information shown in FIG. 3. The file ID used for this purpose may be a file ID received from the actor as part of the initial storage request or received in a subsequent transmission from the actor or may be generated by the Oracle independently. The latter is preferred to ensure that the file ID is unique. The Oracle also transmits a list of actor IDs to the assignment storage node 103 for storage in the new block. In one embodiment a list of the IDs of the actors permitted to access the file to be stored is included in the storage request initially received from the actor computing device or in a data transmission (not shown) received later from the actor computing device. In another embodiment the actor is associated with a group of actors, wherein the members of the group of actors had been identified to the Oracle prior to receipt of the storage request from the actor computing device and wherein an indication of the members of the group is stored in a data storage device accessible to the Oracle. In this embodiment the Oracle is configured to automatically associate a storage request received from an actor computing device belonging to or operated by an actor from the group of actors with all of the actors in the group. In this embodiment the Oracle identifies all actors in the group for inclusion in the block to the assignment storage node 103.

The Oracle moreover informs the assignment storage node 103 as part of the instructions to create the new block of the nature and duration of the access type enjoyed by individual actors. The nature of the access type may be any of the access types discussed above with reference to FIG. 3. The duration of the access type may start at the time of creation of the new block/storage of the file or may be indicated starting at a point in the future. Access permission duration may be unlimited (in which case the endpoint for the access right may remain undefined) may be associated with a predetermined endpoint. This predetermined endpoint may be the same for all identified actors or may differ between actors.

In one embodiment the storage request initially received from the actor computing device to the Oracle or in a later data transmission (not shown) from the actor computing device to the Oracle comprises the access permission duration start and, if appropriate, end times for the individual actors, associated with their respective actor IDs. An alternative embodiment a single access permission duration start point and, if appropriate, access permission duration endpoint is provided for the Oracle to apply to all actors concerned.

Once assignment storage node 103 has created the new block it confirms completion of the action to the Oracle.

The file to be stored is subsequently fragmented and/or encrypted, for example in one of the manners described above with reference to FIG. 4A, FIG. 4B or FIG. 40. Additionally hash values of the individual fragments are computed. As indicated in FIG. 6, fragmentation of the file can be performed by the actor computing device or by the Oracle. Alternatively, one of the actor computing device or the Oracle may undertake fragmentation whilst the other one of the actor computing device or the Oracle performs encryption. The fragmented and/or encrypted parts of the file to be stored are then sent by the Oracle to the storage devices for storage. Once the storage devices have stored the components of the file, the storage locations used for this storage are reported to the Oracle by the storage devices. In an alternative embodiment, the Oracle has visibility of an address space of some or all of these storage devices and sends the fragments for storage in particular locations of the storage devices selected by the Oracle, i.e. specifies the storage locations to the storage devices when requesting storage for the file components. Once the storage locations of the various file fragments are known, the Oracle sends instructions to the agreement storage node 102 to create a new block to record the details required to retrieve the stored fragments and to reassemble them into a copy of the originally stored file. An example of the details provided by the Oracle to the agreement storage node 102 is shown in and described above with reference to FIG. 5.

Figure 7:
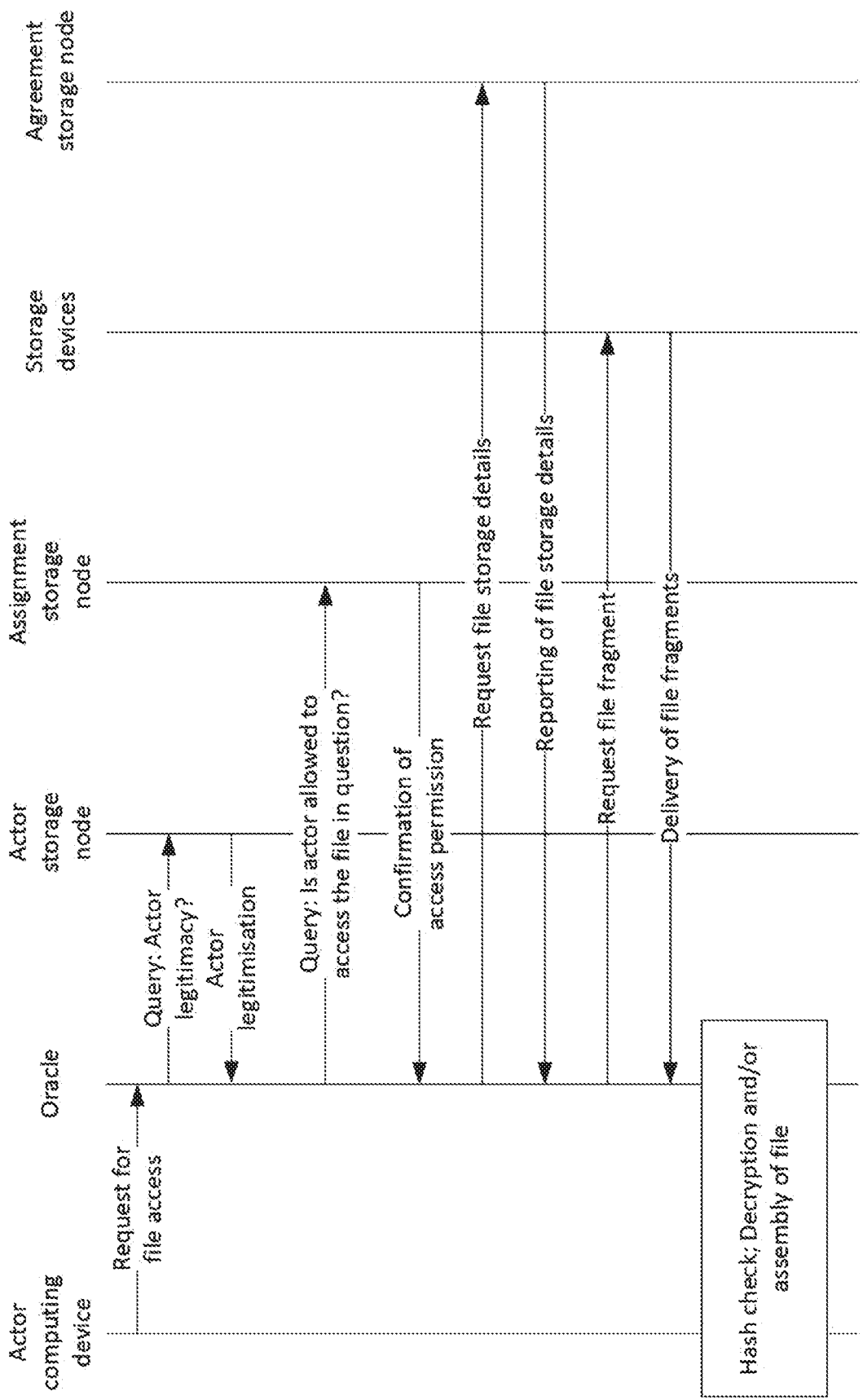
FIG. 7 illustrates a message exchange when an actor seeks to access a stored file in an embodiment.

Turning to FIG. 7, this figure illustrates the exchange of messages between the components of the system, such as system 50 shown in FIG. 1, when access to a stored file is requested. An access request is sent from an actor computing device of the actor seeking to gain access to the stored file to the Oracle. The access request comprises the actor ID or the actor name as well as the ID of the file to be accessed. The Oracle sends a query relating to the actor status and/or the actor's legitimacy to the actor storage node 101. This query either includes the actor ID or the actor name. The actor storage node 101 locates the most up-to-date records relating to the act ID or actor name in the manner described above with reference to FIG. 6. Once the record relating to the actor has been located by the actor storage node the actor storage node 101 reports back to the Oracle indicating, based on the retrieved information, if the actor is entitled to access files in the system shown in FIG. 1.

If the actor storage node 101 indicates that the actor is not entitled to access files on the system the Oracle sends a message (not shown) to the actor computing device indicating that access to the system has been denied.

If the actor storage node 101 has indicated to the Oracle that the actor is entitled to access files stored on the system the Oracle proceeds to send a query to the assignment storage node 103. The query comprises the actor ID and/or actor name as well as the ID of the file to be accessed.

The assignment storage node 103 interrogates the blocks stored therein in reverse time sequential order until a storage block relating to the identified file has been located. This storage block is the storage block that comprises the most up-to-date information relating to the stored file. The assignment storage node 103 analyses the information in the retrieved block and determines if the actor is entitled to access the file by determining if the ID of the actor is mentioned in the block and whether or not the actor is entitled to access the file at a current date and time in view of start and end times associated with the actor as stored in the block in the assignment storage node 103.

If the assignment storage node 103 determines that the actor is either not listed as an actor entitled to access the identified file or if the end time associated with the actors file access has expired, the assignment storage node 103 sends a message to the Oracle indicating that the actor is not entitled to access the file in question. In this case the Oracle sends a message to the actor computing device informing it that access to the file has been denied.

If the assignment storage node 103 determines that the actor is permitted to access the identified file the assignment storage node 103 sends a message to the Oracle indicating the type of access the identified actor is permitted to perform based on the access type information stored for the actor in question in the located block.

Once the actor's access rights have been confirmed, the Oracle sends a message to the agreement storage node 102 with a request for the file fragment storage data to be transmitted to the Oracle. This request comprises the ID of the file to be retrieved. The agreement storage node 102 proceeds to interrogate the blocks stored therein in reverse time sequential order until the storage block relating to the identified file has been located. This storage block is the storage block that comprises the most up-to-date information relating to the stored file and its fragments. The agreement storage node 102 transmits part or all of the retrieved information to the Oracle. In one embodiment the request for file storage details are sent by the Oracle to the agreement storage node 102 comprises a public key that is used by the agreement storage node 102 to encrypt the retrieved storage information prior to reporting this information to the Oracle. The Oracle can then use its private key to decrypt the information received from the agreement storage node 102. The use of encryption is advantageous, given that the information sent from the agreement storage node 102 to the Oracle comprises keys for decrypting the stored fragments and/or the fragments' hash values. It will be appreciated that public-private key encryption is merely an example of an encryption mechanism that may be used for any of the encryption/decryption mechanisms described herein and that any other suitable form of encryption may be use for transmission of this message or of any other message between the nodes of the system.

The Oracle uses the received file storage details to send one or more requests for delivery of the identified file fragments comprised in the file in question to the storage devices identified in the file storage details. The storage devices retrieve and deliver the requested file fragments to the Oracle upon receipt of this request.

In one embodiment the Oracle calculates a hash value of the file fragment. If the hash value stored with the file information has been calculated on the basis of the encrypted file fragment then the Oracle calculates another hash value of the encrypted file fragment and compares it to the hash value relating to the file fragment in question received from the agreement storage node 102. If the hash value stored with the file information has been calculated on the basis of the decrypted file fragment then the Oracle calculates another hash value of the decrypted file fragment and compares it to the hash value relating to the file fragment in question received from the agreement storage node 102. If the stored hash value and the newly calculated hash value for each file fragment are identical the Oracle concludes that the stored file fragments have not been tampered with and that they are consequently suitable for use in assembling a copy for the stored file. In this case the Oracle proceeds to assemble the stored file and transmitted to the actor computing device. In an alternative embodiment the Oracle does not perform any processing on the file fragments received from the storage devices and instead merely forwards the file fragments to the actor computing device alongside the hash and key values previously received from the agreement storage node 102. In this case the actor computing device performs the checking and assembling steps performed by the Oracle in the first described embodiment. In this case the transmission from the Oracle to the actor computing device is encrypted, for example, in the manner discussed above with reference to the transmission of the file storage details between the agreement storage node 102 and the Oracle. It will nevertheless be appreciated that this type of encryption is only one example of an encryption mechanism that can be used in embodiments and that any other suitable encryption mechanisms may instead find use in embodiments.

Figure 8:
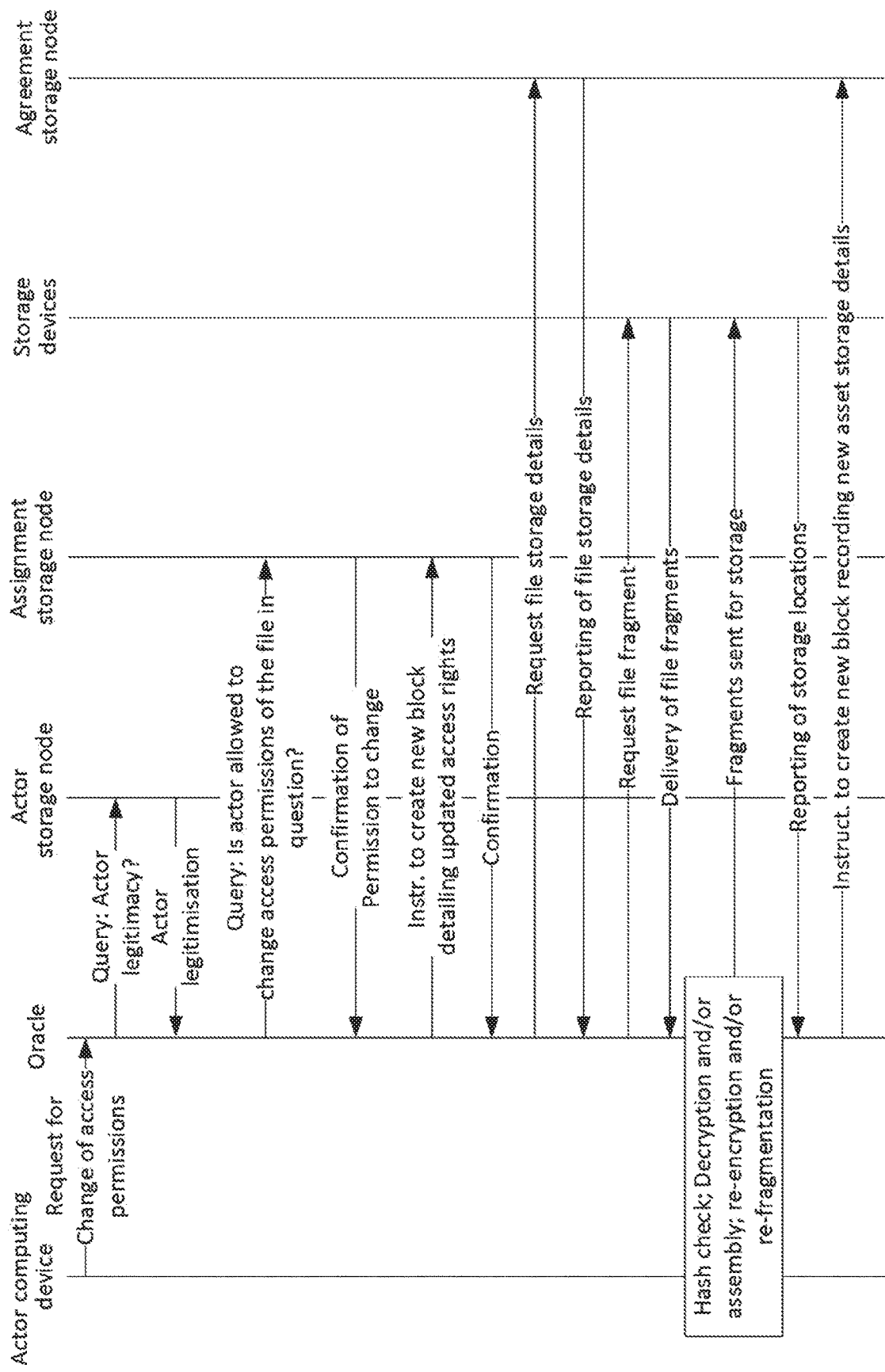
FIG. 8 illustrates a message exchange when access permissions for a stored file are changed in an embodiment.

FIG. 8 illustrates an embodiment in which messages are exchanged between the components of the system shown in FIG. 1 for the purposes of changing the access rights of actors. Changes to access rights of actors include changing the rights actors that currently have access rights, including changing the type of access right granted and rescinding access rights altogether as well as granting access rights to actors that did not have access rights before.

In an initial step an actor transmits a request for a change in access permissions from the actor computing device to the Oracle. This request comprises both the actor ID/actor name and the ID of the file for which access permissions are requested to be changed. In the manner discussed above with reference to FIGS. 6 and 7 the Oracle interrogates the actor storage node 101 with a view to determine if the actor is entitled to interact with the system shown in FIG. 1. If the change to access rights includes a request to grant access rights to an actor that has not yet been identified as being trustworthy the actor name and or ID is communicated to the actor storage node 101 for verification in the manner described above with reference to FIG. 6.

If the actor storage node 101 indicates to the Oracle that the requesting actor is entitled to access the system shown in FIG. 1 the Oracle sends a query to the assignment storage node 103 comprising the actor name or ID and requesting confirmation of whether or not the actor is entitled to modify the access permissions of the file. Following receipt of the request the assignment storage node 103 queries its stored blocks in reverse time sequential order until a block relating to the file identified by the file ID provided by the Oracle is found. This block represents the most up-to-date information relating to the file identified by the file ID provided by the Oracle to the assignment storage node 103. The assignment storage node 103 checks if the retrieved data indicates that the actor has access rights and, if so, if those access rights permit the actor to change access rights to the file. The assignment storage node 103 sends a confirmation message to the Oracle indicating whether or not the actor is entitled to change access rights according to the determination made by the assignment storage node 103.

If it has been determined that the actor is entitled to change the file access rights the changes of the access rights requested in a (or the initially received) message from the actor computing device are communicated to the assignment storage node 103 in a request for the assignment storage node 103 to create a new block in the block chain, storing the updated access rights.

In one embodiment it is the actor computing device that is responsible for decrypting and reassembling the file when accessing the file. In this embodiment all actor computing devices that previously had access rights to the file may have become aware of the keys and hash values associated with the stored file fragments. In this embodiment it is necessary to re-encrypt file fragments and to calculate new hash values associated with the file fragments when changing access rights to the file so as to prevent unauthorized file access by actors no longer entitled to access the stored file. To this end the Oracle sends a request for file storage details to the agreement storage node 102 and the agreement storage node 102 determines the file storage details for the file in question and reports these details back to the Oracle in the manner described above with reference to FIG. 7. The Oracle then proceeds to request a delivery of the file fragments from the storage devices and receives the file fragments from the storage devices once retrieved from storage also as described above with reference to FIG. 7. The veracity of the received fragments is subsequently checked by the Oracle and/or the actor computing device by performing a check of the hash values as discussed above with reference to FIG. 7, following a re-fragmentation and/or re-encryption of the file fragments and they storage of the thus prepared fragments in the storage devices in the manner described above with reference to FIG. 6. Although not shown in FIG. 7, the Oracle, in one embodiment, sends a request to the storage devices to mark the storage locations holding the superseded file fragments for erasure. The Oracle finally sends a request to the agreement storage node 102 to store the new file storage details of the newly stored file fragments.

In alternative embodiments access rights may be changed automatically by the Oracle. This may be the case if a trigger event occurs, such as the expiration of an end time associated with an actor's access privileges. Whilst no changes to the stored assignment or agreement may be required in some circumstances, in other circumstances, such as when an actor that, after the trigger event is no longer entitled to access a stored file has previously had access to stored keys and hash values, re-encryption and/or re-fragmentation of the file, followed by renewed storage may be necessary. In this case the re-fragmentation and re-encryption steps discussed above with reference to FIG. 6 are performed.

Figure 9:
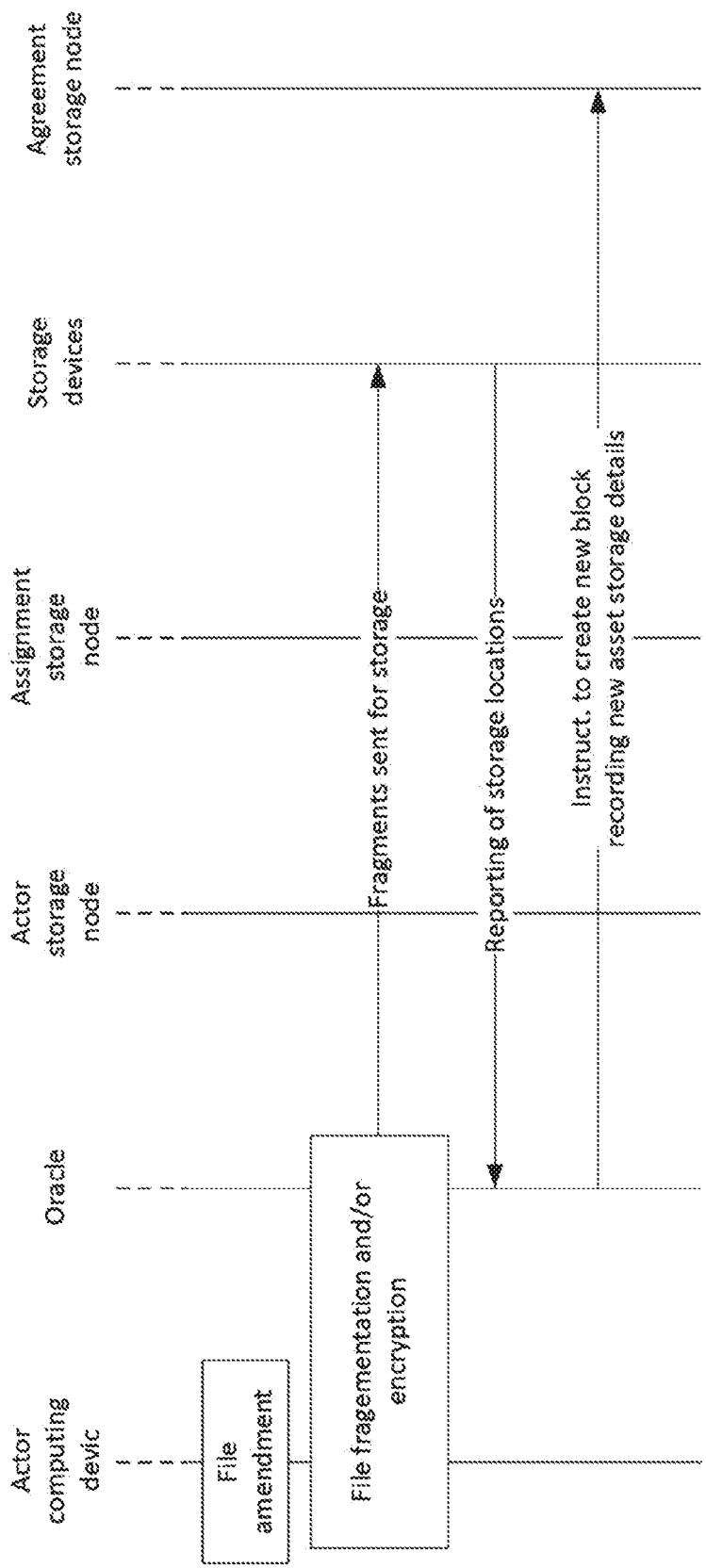
FIG. 9 illustrates a message exchange when a stored file is amended in an embodiment.

FIG. 9 illustrates an embodiment in which an already stored file is amended. The steps shown in FIG. 9 follow from the steps shown in FIG. 7, so that at the start of the process shown in FIG. 9 the actor seeking to amend the file in question has already been authenticated, been granted file amendment privileges and either received the fragments of the stored file, verified, decrypted and reassembled the fragments or received the reassembled stored file from the Oracle. Once the actor has amended the file, the file is once again fragmented and/or re-encrypted by either the actor computing device all the Oracle and the resulting fragments are sent for storage to the storage devices. The storage devices store the fragments and report the locations of the newly stored file fragments to the Oracle. Upon receipt of the report or reports, the Oracle proceeds to instruct the agreement storage node 102 to create a new block in its block chain relating to the file ID of the amended file and recording the new storage locations as well as some or all of the other information relating to the file as discussed with reference to FIG. 5. Although not shown, once the storage devices have reported the storage locations of the newly created file fragments to the Oracle the Oracle may, optionally, in a message to storage devices referencing the previously stored and now superseded file fragments and requesting the storage price devices that they either be erased or marked for erasure at the appropriate time.

The above discussed processes ensure files created and or controlled by an Assignior actor can be securely stored using blockchain private keys and can be shared with Assignees it chooses to share with. In very secure circumstances, the Assignor may delegate custodians parts of the private key (e.g lawyers) who can reassemble the key and gain access to the original files.

In the following an embodiment showing the processing of a file is discussed. "b" is a block, "R" is raw data, "SD" the start timestamp date, "ED" the end timestamp date, "SH" the hashing encoding algorithm and "e" an encryption algorithm with associated "d" as the decryption algorithm using a private key (pk) then pk=e(Rn)+b(Rn+2), where n is a running number of the raw data fragment R.

1. The file is hashed using recognised cryptography protocols such as SHA (256) or SHA (512) using a salt that is over 64 characters long (e.g DNA profile, Fingerprint, Facial pattern etc).
   a. The file is split into n parts. Each part is hashed and the total is hashed. With h denoting SHA (256), hf denoting a hashed file, f denoting a Base64 file and ff a Base64 file fragment, the hashed file hf can be expressed as: hf=h(h(ff1)+h(ff2)+h(ff3)).

2. A private key pk is generated for each hash, with the private key for the nth fragment of the file being denote by pkn.
3. Each private key is split and transmitted to custodians who are trusted parties
4. In an example in which the private keys are distributed amongst three custodians, custodians A, B and C
   a. A will be transmitted pki and pk3
   b. B will be transmitted pk2 and pk3
   c. C will be transmitted pk1 and pk2 5. In the example the two custodians, e.g A and B, A and C or B and C, will be able to open and view the original file when using their respective private keys jointly.
5. The hf is added to a permissioned blockchain. The custodians, acting jointly by combining their respective private key fragments to recreate the private key, can inspect the stored hash values and compare them with newly created hash values for either or both of the individually hashed file fragments or the reassembled filed. In this way the custodians can verify that the stored file fragments, and therefore also the entire stored file, has not been altered while stored.
6. Using a computing device as a lead server, it can populate follower devices and replicate the encrypted files it has. The devices will use hashing and encryption using local to keep a follower copy. Leaders can be shared as above but only with the Oracle permission and this can be revoked by adding a new block that references the previous block and appends an end date time to indicate the previous block is no longer available.

Terminology

For the purposes of describing and illustrating example embodiments of the System 50, the following terms and subsequent related terms are defined in the following: (1) Actors (2) Agreements (3) Assignments (4) Trigger Events (5) Blockchain (6) Passcodes.

Actor: An Actor is a Natural or Non Natural person who is involved in commerce or transactions with each other but not themselves. "Natural" is a human being Actor. "Non Natural" is a legal entity Actor such as a limited liability corporation, or collection of Naturals such as a partnership. An Actor has a unique identifier. A natural Actor's unique identifier can be provided by a validation authority, such as births and deaths government agency. A non natural Actor's unique identifier can be provided by a validation authority such as a company registrar or legal entity identifier Agreement: an "Agreement" contract that can be created by an owner or creator of a file. The Agreement may be an agreement to share a file with other actors. The Agreement may be a smart agreement or smart contract and may comprise elements that stipulate, and cause the Oracle to perform or initiate the performance of, changes to the agreement, to Actor access rights, storage and encryption properties of the file and/or its fragments, or any other changes associated with the original agreement, upon fulfilment of a trigger condition or the occurrence of a trigger event. The Oracle or any of the nodes in the system 50 may monitor trigger events or trigger conditions. The trigger conditions may be general conditions relating to an environment within which the Agreement is framed, a wider business or societal environment or conditions associated with Actors granted access rights to the stored file. The owner actor is an Assignor. The Assignor can transfer the Assignor rights to another actor by creating a new Agreement.

Assignment: An Assignment is a file specific list of Actors and the associated rights of these actors to access the file.

"Trigger Events" are events that cause one or a plurality of nodes to reassign Assignees, reassign Assignors or alter the Agreement terms and conditions through creating new blocks and referencing to previous blocks.

The "Hashing Function" or "Encoding" is any one-way function that can be used to map data of arbitrary size onto data of a fixed size. Hashing is a form of Symmetric Encryption where the values returned by a hash function are called hash values, hash codes, digests, or simply hashes. A cryptographic hash function allows one to easily verify whether some input data, map onto a given hash value, but if the input data is unknown it is deliberately difficult to reconstruct it (or any equivalent alternatives) by knowing the stored hash value. A hash function (also called a one-way compression function) should have the following properties:

Easy to compute: It is easy to calculate the hash output based on a given input.

Preimage-resistance: If an attacker only knows the output it should be unfeasible to calculate an input. In other words, given an output h, it should be unfeasible to calculate an input m such that hash(m)=h.

Second preimage-resistance: Given an input m1 whose output is h, it should be unfeasible to find another input m2 that has the same output h i.e. 10 hash(m1) hash(m2).

Collision-resistance: It should be hard to find any two different inputs that compress to the same output i.e. an attacker should not be able to find a pair of messages m1 0 m2 such that hash(m1)=hash(m2).

"Blockchain": A growing list of records, called blocks, that are linked using cryptography. Each block contains a cryptographic hash of the previous block, a timestamp, and other transaction data. Each block is then hashed and has its own private key.

In cryptography, "encryption" is the process of encoding a message or information in such a way that only Actors with access can access it and those who are not authorized cannot. Encryption does not itself prevent interference, but denies the intelligible content to a would-be interceptor. In an encryption scheme, the intended information or message, referred to as plaintext, is encrypted using an encryption algorithm, a cipher, and a secret key, generating ciphertext that can be read only if decrypted.

Symmetric Encryption Symmetric-key algorithms use the same cryptographic keys for both encryption and decryption processes. In practice this means that a file can be locked and unlocked with a single password. As a result, to share a file with two or more parties, the keys represent a shared secret between the parties.

Examples of popular symmetric-key algorithms include Twofish, Serpent, AES (Rijndael), Blowfish, CASTS, Kuznyechik, RC4, DES, 3DES, Skipjack, Safer+/++ (Bluetooth), and IDEA.

The requirement that both parties have access to the secret key is one of the main drawbacks of symmetric key encryption for sharing of files between multiple parties.

"Asymmetric Encryption" or "Public-Key Cryptography" is a cryptographic system that uses pairs of keys: public keys which may be disseminated widely, and private keys which are known only to the owner.

The generation of such keys depends on cryptographic algorithms based on mathematical problems to produce one-way functions. Effective security only requires keeping the private key private; the public key can be openly distributed without compromising security.

In such a system, any person can encrypt a message using the receiver's public key, but that encrypted message can only be decrypted with the receiver's pass code.

Examples of asymmetric key techniques for varied purposes include: RSA Encryption; EC (Elliptical Curve) Encryption; DSS.

While certain arrangements have been described, the arrangements have been presented by way of example only, and are not intended to limit the scope of protection. The inventive concepts described herein may be implemented in a variety of other forms. In addition, various omissions, substitutions and changes to the specific implementations described herein may be made without departing from the scope of protection defined in the following claims.

We claim:

1. A computer-implemented method of operating a data processing system comprising an actor authorization node, an access right storage node, a file record node and one or more processors, the method comprising steps of:

receiving, from a computing device, a request to access a file, the request comprising information identifying an actor making the request and a file to be accessed;

obtaining an indication from a first computing device operated by the actor authorization node whether or not the identified actor is recorded on the actor authorization node as trustworthy, wherein the actor authorization node stores actor information in blocks in a first blockchain, such actor information identifying an actor who has access rights to stored files, such actor information including an actor ID which identifies an actor;

obtaining an indication from a second computing device operated by the access right storage node of the access right the identified actor has to the identified file, wherein the access right storage node stores access rights information in blocks in a second blockchain, such access rights information identifying which actors recorded in the actor authorization node have access to which stored files, wherein for each stored file, the access rights information includes a list of which actors, identified by the actor's respective actor ID, has access to the stored file;

if the identified actor has been indicated by the actor authorization node as being trustworthy and by the access right storage node as having access rights, obtaining file storage and access details from a third computing device operated by the file record node, wherein each file is fragmented and wherein individual file fragments are stored in different storage locations, and wherein the file record node stores information in blocks in a third blockchain regarding a storage location of where each fragment of each file is stored; and sending the file storage and access details to the computing device or using the file storage and access details to access the stored file and sending the accessed file to the computing device;

wherein the file storage and access details comprise at least one of a file storage location, a file encryption key, a calculated characteristic of the stored file and a calculated characteristic of an encrypted version of the stored file; and wherein each file is fragmented into n fragments and a first subset of the n fragments containing x fragments, where x and n are integers and x is less than n, is added to a first data storage packet, a second subset of the n fragments containing x fragments is added to a second data storage packet and a third subset of the n fragments containing x fragments is added to a third data storage packet, where the subsets are selected such that any two of the first, second or third data storage packets contains all n of the fragments.

2. The computer-implemented method of claim 1, wherein each of the first data storage packet, the second data storage packet and the third data storage packet are stored in respective computing devices.

3. The computer-implemented method of claim 2 wherein each computing device is included in a separate cloud computing platform.

4. The computer-implemented method of claim 1 wherein each file is of size f bytes with a minimum size of m bytes, where f and n are integers, and each fragment has a random length, where the random length of each of the n fragments is generated according to the formula: length of fragment i (Li)=random value between m and (f/n).

5. The computer-implemented method of claim 4 wherein for a first fragment of the n fragments, the random length is between m and (f/n).

6. The computer-implemented method of claim 5 wherein for the second fragment of the n fragments, the random length is between m and ((f−L1)/(n−1)) where L1 is the length of the first fragment.

7. The computer-implemented method of claim 6 wherein the length of a last fragment of the n fragments is generated according to the formula: length of the last fragment (Ln) =Max (m, (f−sum of lengths of previous fragments).

8. The computer-implemented method of claim 1 wherein c subsets of the n fragments are provided, and a threshold k is selected such that k is greater than one-third of c, where c and k are integers, and k is selected so that it is possible to reconstruct the file if a third of the data storage packets are unavailable.

9. The computer-implemented method of claim 1 wherein a first data storage packet has x of the n fragments for a file and does not have n−x of the n fragments for the file.

10. The computer-implemented method of claim 9 wherein a second data storage packet has x of the n fragments for a file and does not have n−x of the n fragments for the file, where the first and second data storage packets have respectively different subsets x of the n fragments, such that the n−x fragments that are missing in the first data storage packet are contained in the x fragments in the second data storage packet.

11. The computer-implemented method of claim 8 wherein a file is reconstructed by obtaining k out of the c data storage packets.

12. A system comprising means adapted for carrying out all the steps of a method of operating a data processing system comprising an actor authorization node, an access right storage node, a file record node and one or more processors, the method comprising steps of:

receiving, from a computing device, a request to access a file, the request comprising information identifying an actor making the request and a file to be accessed;

obtaining an indication from a first computing device operated by the actor authorization node whether or not the identified actor is recorded on the actor authorization node as trustworthy, wherein the actor authorization node stores actor information in blocks in a first blockchain, such actor information identifying an actor who has access rights to stored files, such actor information including an actor ID which identifies an actor;

obtaining an indication from a second computing device operated by the access right storage node of the access right the identified actor has to the identified file, wherein the access right storage node stores access rights information in blocks in a second blockchain, such access rights information identifying which actors recorded in the actor authorization node have access to which stored files, wherein for each stored file, the access rights information includes a list of which actors, identified by the actor's respective actor ID, has access to the stored file;

if the identified actor has been indicated by the actor authorization node as being trustworthy and by the access right storage node as having access rights, obtaining file storage and access details from a third computing device operated by the file record node, wherein each file is fragmented and wherein individual file fragments are stored in different storage locations, and wherein the file record node stores information in blocks in a third blockchain regarding a storage location of where each fragment of each file is stored; and sending the file storage and access details to the computing device or using the file storage and access details to access the stored file and sending the accessed file to the computing device;

wherein the file storage and access details comprise at least one of a file storage location, a file encryption key, a calculated characteristic of the stored file and a calculated characteristic of an encrypted version of the stored file; and wherein each file is fragmented into n fragments and a first subset of the n fragments containing x fragments, where x and n are integers and x is less than n, is added to a first data storage packet, a second subset of the n fragments containing x fragments is added to a second data storage packet and a third subset of the n fragments containing x fragments is added to a third data storage packet, where the subsets are selected such that any two of the first, second or third data storage packets contains all n of the fragments.

\* \* \* \* \*